US012562099B2

(12) United States Patent
Fu et al.

(10) Patent No.: US 12,562,099 B2
(45) Date of Patent: Feb. 24, 2026

(54) LIGHT EMITTING MODULE AND DISPLAY DEVICE

(71) Applicants: BOE MLED TECHNOLOGY CO., LTD., Beijing (CN); BOE TECHNOLOGY GROUP CO., LTD., Beijing (CN)

(72) Inventors: Bao Fu, Beijing (CN); Zhitao Zhang, Beijing (CN); Qibing Gu, Beijing (CN); Changhao Wang, Beijing (CN); Xiuling Li, Beijing (CN); Lingyun Shi, Beijing (CN); Xue Dong, Beijing (CN); Hao Zhou, Beijing (CN); Lili Jia, Beijing (CN)

(73) Assignees: BOE MLED TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 102 days.

(21) Appl. No.: 18/293,352

(22) PCT Filed: Dec. 23, 2022

(86) PCT No.: PCT/CN2022/141524

§ 371 (c)(1),
(2) Date: Jan. 29, 2024

(87) PCT Pub. No.: WO2024/130716

PCT Pub. Date: Jun. 27, 2024

(65) Prior Publication Data

US 2025/0095543 A1 Mar. 20, 2025

(51) Int. Cl.
*G09G 3/32* (2016.01)

(52) U.S. Cl.
CPC ....... *G09G 3/32* (2013.01); *G09G 2300/0426* (2013.01); *G09G 2330/021* (2013.01)

(58) Field of Classification Search
CPC .................. H10H 29/857; G09G 3/32; G09G 2300/0426; G09G 2330/021
See application file for complete search history.

(56) References Cited

U.S. PATENT DOCUMENTS 8,305,332 B2 11/2012 Park et al.
8,497,821 B2 7/2013 Cok
(Continued)

FOREIGN PATENT DOCUMENTS

CN 102365671 A 2/2012
CN 103348402 A 10/2013
(Continued)

OTHER PUBLICATIONS

International Search Report and Written Opinion dated Sep. 21, 2023, for PCT Application No. PCT/CN2022/141524, 10 pages.

*Primary Examiner* — Deeprose Subedi
(74) *Attorney, Agent, or Firm* — Kinney & Lange, P.A.

(57) ABSTRACT

A light emitting module includes: a light emitting element array provided on a first substrate, including a plurality of light emitting elements arranged in an array in a row direction and a column direction, each of which includes a first electrode and a second electrode, wherein a driving current of the light emitting element is greater than or equal to 1 mA; and a plurality of row driving chips and a plurality of column driving chips provided on the first substrate. At least one row driving chip and at least one column driving chip are spaced apart in the row direction and the column direction. At least one row driving chip and at least one column driving chip are respectively electrically connected to the first electrodes of at least one row of light emitting elements and the second electrodes of at least one column of light emitting elements.

18 Claims, 16 Drawing Sheets

(56) References Cited

U.S. PATENT DOCUMENTS

| | | | | |
|---|---|---|---|---|
| 8,803,857 | B2 | 8/2014 | Cok | |
| 10,276,751 | B2 | 4/2019 | Sato et al. | |
| 10,593,840 | B2 | 3/2020 | Sato et al. | |
| 10,950,194 | B1 | 3/2021 | Chan et al. | |
| 11,386,826 | B1 | 7/2022 | Cok et al. | |
| 11,514,845 | B2 | 11/2022 | Dai et al. | |
| 12,014,672 | B2 | 6/2024 | Dai et al. | |
| 2003/0197665 | A1* | 10/2003 | Sung | G09G 3/3233 345/82 |
| 2009/0058792 | A1 | 3/2009 | Park et al. | |
| 2010/0207848 | A1 | 8/2010 | Cok | |
| 2010/0207851 | A1* | 8/2010 | Cok | H10K 59/129 345/82 |
| 2012/0206499 | A1 | 8/2012 | Cok | |
| 2019/0333901 | A1 | 10/2019 | Cok et al. | |
| 2021/0104202 | A1 | 4/2021 | Chan et al. | |
| 2024/0030273 | A1 | 1/2024 | Cui et al. | |

FOREIGN PATENT DOCUMENTS

| | | | |
|---|---|---|---|
| CN | 104537981 | A | 4/2015 |
| CN | 104701444 | A | 6/2015 |
| CN | 205508356 | U | 8/2016 |
| CN | 108597458 | A | 9/2018 |
| CN | 108597473 | A | 9/2018 |
| CN | 109362150 | A | 2/2019 |
| CN | 111415626 | A | 7/2020 |
| CN | 111477176 | A | 7/2020 |
| CN | 112306952 | A | 2/2021 |
| CN | 112614464 | A | 4/2021 |
| CN | 112993108 | A | 6/2021 |
| CN | 113223420 | A | 8/2021 |
| CN | 113539170 | A | 10/2021 |
| CN | 114185200 | A | 3/2022 |
| KR | 20090022452 | A | 3/2009 |

* cited by examiner

LIGHT EMITTING MODULE AND DISPLAY DEVICE

CROSS REFERENCE TO RELATED APPLICATION(S)

This application is a Section 371 National Stage Application of International Application No. PCT/CN2022/141524, filed on Dec. 23, 2022, entitled "LIGHT EMITTING MODULE AND DISPLAY DEVICE", the whole disclosure of which is incorporated herein by reference in its entirety.

TECHNICAL FIELD

The present disclosure relates to the field of display technology, and in particular to a light emitting module and a display device.

BACKGROUND

Light emitting diode (LED) technology has been developed for nearly thirty years, and its application range is expanding continuously. For example, a light emitting diode may be applied in the field of display and may serve as a backlight source of a display device or as an LED display screen. With the development of technology, mini light emitting diode (Mini LED) has gradually become a research hotspot in the field of display technology. For example, Mini LED may be used in a light emitting module of a liquid crystal display device as a light emitting element of the light emitting module. By using advantages of Mini LED, the light emitting module may achieve small thickness, local dimming, rapid response, simple structure, long service life, and other advantages.

The above information disclosed in this section is only for the understanding of the background of the inventive concept of the present disclosure. Therefore, the above information may include information that does not constitute the related art.

SUMMARY

In an aspect, a light emitting module is provided, including: a first substrate; a light emitting element array provided on the first substrate, the light emitting element array includes a plurality of light emitting elements arranged in an array in a row direction and a column direction, each of the plurality of light emitting elements includes a first electrode and a second electrode, and a driving current of the light emitting element is greater than or equal to 1 mA; a plurality of row driving chips provided on the first substrate, at least one of the plurality of row driving chips is configured to drive at least one row of light emitting elements; and a plurality of column driving chips provided on the first substrate, at least one of the plurality of column driving chips is configured to drive at least one column of light emitting elements, at least one of the plurality of row driving chips and at least one of the plurality of column driving chips are spaced apart in a row direction and a column direction; and at least one of the plurality of row driving chips is electrically connected to the first electrodes of at least one row of light emitting elements, and at least one of the plurality of column driving chips is electrically connected to the second electrodes of at least one column of light emitting elements.

According to some exemplary embodiments, the plurality of row driving chips are arranged in a column and spaced apart in the column direction; and/or the plurality of column driving chips are arranged in a row and spaced apart in the row direction.

According to some exemplary embodiments, the light emitting module further includes a plurality of first wires provided on the first substrate, and at least one of the plurality of first wires extends in the row direction; and at least one of the plurality of row driving chips includes a first scanning signal terminal, and the first scanning signal terminal is electrically connected to the first electrodes of at least part of light emitting elements in at least one row of light emitting elements through the plurality of first wires.

According to some exemplary embodiments, the light emitting module further includes a plurality of second wires provided on the first substrate, and at least one of the plurality of second wires extends in the column direction; and at least one of the plurality of column driving chips includes a first channel signal terminal, and the first channel signal terminal is electrically connected to the second electrodes of at least part of light emitting elements in at least one column of light emitting elements through the plurality of second wires.

According to some exemplary embodiments, at least one of the plurality of row driving chips further includes a second scanning signal terminal, and the second scanning signal terminal is electrically connected to the first electrodes of at least part of light emitting elements in at least one row of light emitting elements through the plurality of first wires.

According to some exemplary embodiments, for one and same row driving chip, the first scanning signal terminal is electrically connected to the first electrodes of at least part of light emitting elements in an $i^{th}$ row of light emitting elements, and the second scanning signal terminal is electrically connected to the first electrodes of at least part of light emitting elements in an $(i+1)^{th}$ row of light emitting elements, where i is a positive integer greater than or equal to 1.

According to some exemplary embodiments, at least one of the plurality of column driving chips further includes a second channel signal terminal, and the second channel signal terminal is electrically connected to the second electrodes of at least part of light emitting elements in at least one column of light emitting elements through the plurality of second wires.

According to some exemplary embodiments, for one and same column driving chip, the first channel signal terminal is electrically connected to the second electrodes of at least part of light emitting elements in a $j^{th}$ column of light emitting elements, and the second channel signal terminal is electrically connected to the second electrodes of at least part of light emitting elements in a $(j+1)^{th}$ column of light emitting elements, where j is a positive integer greater than or equal to 1.

According to some exemplary embodiments, the row driving chip includes at least two first scanning signal terminals and at least two second scanning signal terminals; and one of the at least two first scanning signal terminals is electrically connected to the first electrodes of a part of light emitting elements in the $i^{th}$ row of light emitting elements, and another of the at least two first scanning signal terminals is electrically connected to the first electrodes of another part of light emitting elements in the $i^{th}$ row of light emitting elements; and/or one of the at least two second scanning signal terminals is electrically connected to the first electrodes of a part of light emitting elements in the (i+1)$^{th}$ row of light emitting elements, and another of the at least two second scanning signal terminals is electrically connected to the first electrodes of another part of light emitting elements in the (i+1)$^{th}$ row of light emitting elements.

According to some exemplary embodiments, the column driving chip includes at least two first channel signal terminals and at least two second channel signal terminals; and one of the at least two first channel signal terminals is electrically connected to the second electrodes of a part of light emitting elements in the j$^{th}$ column of light emitting elements, and another of the at least two first channel signal terminals is electrically connected to the second electrodes of another part of light emitting elements in the j$^{th}$ column of light emitting elements; and/or one of the at least two second channel signal terminals is electrically connected to the second electrodes of a part of light emitting elements in the (j+1)$^{th}$ column of light emitting elements, and another of the at least two second channel signal terminals is electrically connected to the second electrodes of another part of light emitting elements in the (j+1)$^{th}$ column of light emitting elements.

According to some exemplary embodiments, the row driving chip further includes a first voltage signal terminal, a first grounding terminal, a first input terminal, and a first output terminal; and the light emitting module further includes an external driving chip provided on the first substrate, the plurality of row driving chips include a first row driving chip closest to the external driving chip, and the first voltage signal terminal, the first grounding terminal and the first input terminal of the first row driving chip are respectively electrically connected to the external driving chip through a first driving line, a first grounding line and a first input signal line.

According to some exemplary embodiments, the first voltage signal terminal, the first grounding terminal and the first output terminal of a row driving chip in the plurality of row driving chips are respectively electrically connected to the first voltage signal terminal, the grounding terminal and the first input terminal of another row driving chip adjacent in the column direction, through a first voltage signal lead, a first grounding lead and a first signal lead; and the first voltage signal lead, the first grounding lead and the first signal lead respectively extend in the column direction.

According to some exemplary embodiments, the first substrate includes an intersection region, and a first straight line extending in the row direction and extending through each column driving chip intersects, in the intersection region, with a second straight line extending in the column direction and extending through each row driving chip; and the plurality of row driving chips include a second row driving chip and a third row driving chip that are closest to the intersection region, the plurality of column driving chips include a third column driving chip and a fourth column driving chip that are closest to the intersection region, the second row driving chip and the third row driving chip are located on two opposite sides of the intersection region in the column direction, and the third column driving chip and the fourth column driving chip are located on two opposite sides of the intersection region in the row direction.

According to some exemplary embodiments, the column driving chip further includes a second voltage signal terminal, a second grounding terminal, a second input terminal, and a second output terminal; and the plurality of column driving chips include a first column driving chip and a second column driving chip that are closest to a side edge of the first substrate in the column direction, the second voltage signal terminal, the second grounding terminal and the second input terminal of the first column driving chip are respectively electrically connected to the external driving chip through a second driving line, a second grounding line and a second input signal line, and the second voltage signal terminal, the second grounding terminal and the second input terminal of the second column driving chip are respectively electrically connected to the external driving chip through a third driving line, a third grounding line and a third input signal line.

According to some exemplary embodiments, for a plurality of column driving chips located on a same side of the intersection region in the row direction, the second voltage signal terminal, the second grounding terminal and the second output terminal of a column driving chip in the plurality of column driving chips are respectively connected to the second voltage signal terminal, the second grounding terminal and the second input terminal of another column driving chip adjacent in the row direction through a second voltage signal lead, a second grounding lead and a second signal lead; and the second voltage signal lead, the second grounding lead and the second signal lead respectively extend in the row direction.

According to some exemplary embodiments, each of the second driving line, the second grounding line and the second input signal line includes a first sub-portion, a second sub-portion, a third sub-portion and a fourth sub-portion that are connected in sequence, the first sub-portion is connected to the external driving chip, the fourth sub-portion is connected to the column driving chip, the second sub-portion extends in the row direction, the third sub-portion extends in the column direction, and the second sub-portion of each of the second driving line, the second grounding line and the second input signal line and the third sub-portion of each of the second driving line, the second grounding line and the second input signal line are located in a peripheral region of the first substrate.

According to some exemplary embodiments, the first voltage signal lead, the first grounding lead and the first signal lead that are configured to electrically connect the second row driving chip and the third row driving chip extend through the intersection region.

According to some exemplary embodiments, the second voltage signal terminal, the second grounding terminal and the second input terminal of the third column driving chip are respectively electrically connected to the external driving chip through a fourth driving line, a fourth grounding line and a fourth input signal line, and the second voltage signal terminal, the second grounding terminal and the second input terminal of the fourth column driving chip are connected to the external driving chip respectively through a fifth driving line, a fifth grounding line and a fifth input signal line.

According to some exemplary embodiments, each of the fourth driving line, the fourth grounding line and the fourth input signal line extends through the intersection region; and each of the fifth driving line, the fifth grounding line and the fifth input signal line extends through the intersection region.

According to some exemplary embodiments, at least one of the plurality of row driving chips is configured to drive at least four rows of light emitting elements.

According to some exemplary embodiments, the row driving chip includes at least two first scanning signal terminals and at least two second scanning signal terminals; and one of the at least two first scanning signal terminals is electrically connected to the first electrodes of a part of light emitting elements in at least two adjacent rows of light emitting elements, and another of the at least two first scanning signal terminals is electrically connected to the first electrodes of another part of light emitting elements in the at least two adjacent rows of light emitting elements; and/or one of the at least two second scanning signal terminals is electrically connected to the first electrodes of a part of light emitting elements in at least two adjacent rows of light emitting elements, and another of the at least two second scanning signal terminals is electrically connected to the first electrodes of another part of light emitting elements in the at least two adjacent rows of light emitting elements.

According to some exemplary embodiments, the light emitting element includes two first electrodes and a second electrode, and the two first electrodes are spaced apart in the row direction; and at least one of the plurality of second wires extends through a gap between the two first electrodes, an orthographic projection of the plurality of second wires on the base substrate does not overlap with an orthographic projection of the first electrodes on the base substrate, and the orthographic projection of the plurality of second wires on the base substrate does not overlap with an orthographic projection of the plurality of first wires on the base substrate.

According to some exemplary embodiments, the plurality of first wires and the plurality of second wires are located in a same conductive layer.

According to some exemplary embodiments, the light emitting module further includes a connector provided on the base substrate, the connector is located in the intersection region, and the connector and the light emitting element array are located on a same side of the first substrate; and the second row driving chip and the third row driving chip are respectively connected to the connector, and the third column driving chip and the fourth column driving chip are respectively connected to the connector.

According to some exemplary embodiments, the light emitting module further includes a connector provided on the base substrate, an orthographic projection of the connector on the base substrate is located in the intersection region, and the connector and the light emitting element array are located on opposite sides of the first substrate; and the second row driving chip and the third row driving chip are respectively connected to the connector, and the third column driving chip and the fourth column driving chip are respectively connected to the connector.

In another aspect, a display device is provided, including the light emitting module described above.

BRIEF DESCRIPTION OF THE DRAWINGS

Through the following descriptions of the present disclosure with reference to the accompanying drawings, other objectives and advantages of the present disclosure may be obvious and the present disclosure may be understood comprehensively.

Figure 1:
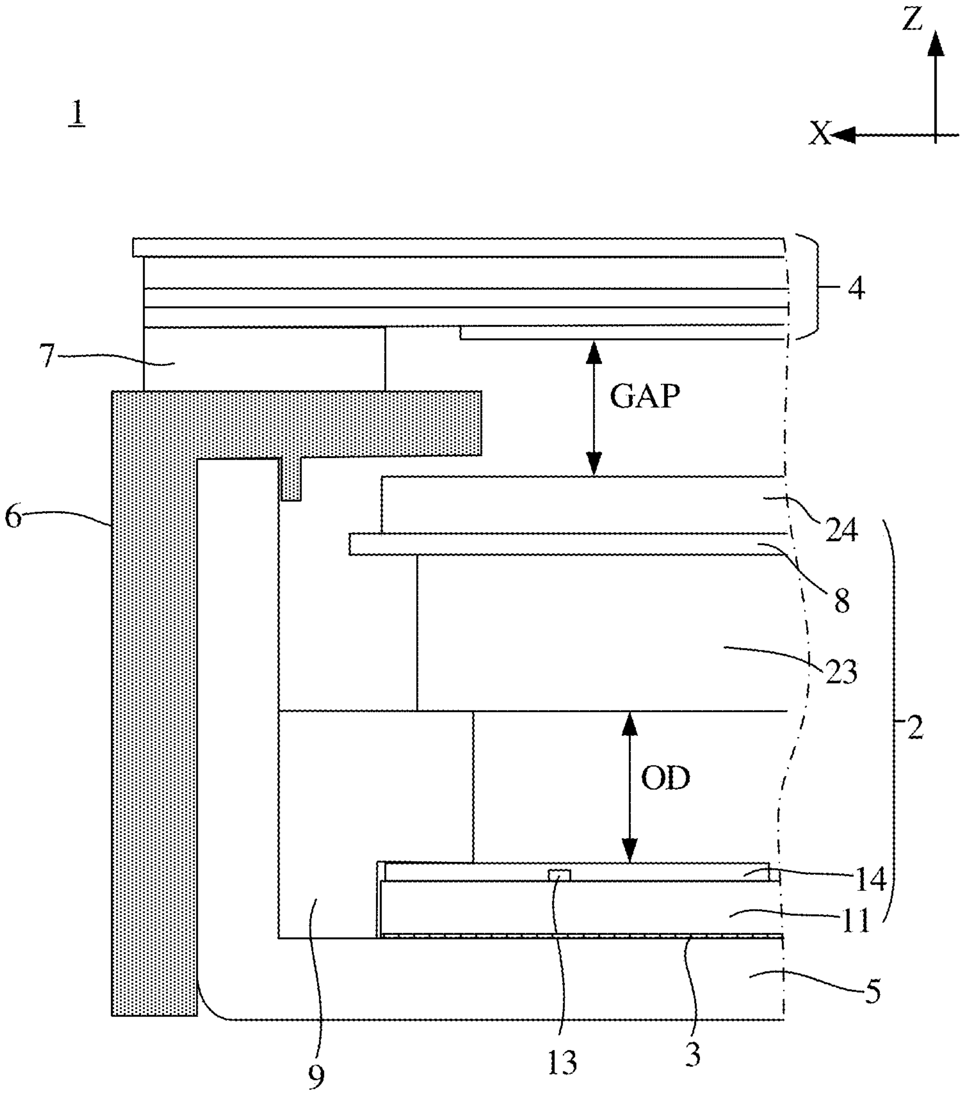
FIG. 1 is a local structural schematic diagram of a display device according to embodiments of the present disclosure.

It should be noted that for sake of clarity, in the accompanying drawings used to describe embodiments of the present disclosure, sizes of layers, structures or regions may be enlarged or reduced, that is, these accompanying drawings are not drawn according to actual scale.

DESCRIPTIONS OF REFERENCE NUMERALS

1—display device; 2—light emitting module; 23—diffusion plate; 24—brightness enhancement film; 3—bonding portion; 4—display panel; 5—back frame; 6—rubber frame; 7—buffer element; 8—color conversion layer; 9—supporting structure; 11—first substrate; 12—Mini LED chip array; 13—Mini LED chip; 201—N pad; 202—P pad; 203—light emitting portion; 14—encapsulation layer; 15—transparent protection structure; 101—solder pad; 102—first conductive layer; 105—second conductive layer; 106—connecting lead; 1061—first lead; 1062—second lead; 107—binding pad; 108—second insulation layer; 1080—vent hole; 109—buffer layer; 110—first planarization layer; 111—second planarization layer; 112—reflective layer; 113—transparent electrode; 114—anisotropic conductive adhesive; 117—first insulation layer; μIC—micro integrated circuit; T—solder paste; 120—LED driving chip; 121—external driving chip; 122—row driving chip; 1221—first scanning signal terminal; 1222—second scanning signal terminal; 1223—first voltage signal terminal; 1224—first grounding terminal; 1225—first input terminal; 1226—first output terminal; 123—column driving chip; 1231—first channel signal terminal; 1232—second channel signal terminal; 1233—second voltage signal terminal; 1234—second grounding terminal; 1235—second input terminal; 1236—second output terminal; 124—first electrode; 125—second electrode; 126—connector; 1261—socket; 127—fan out region.

DETAILED DESCRIPTION OF EMBODIMENTS

In the following descriptions, for the purpose of explanation, many specific details are set forth to provide a comprehensive understanding of various exemplary embodiments. However, it is obvious that the various exemplary embodiments may be implemented without those specific details or with one or more equivalent arrangements. In other cases, well-known structures and devices are shown in block diagrams in order to avoid unnecessarily obscuring the various exemplary embodiments. In addition, the various exemplary embodiments may be different, but need not to be exclusive. For example, without departing from the inventive concept, specific shapes, configurations and characteristics of an exemplary embodiment may be used or implemented in another exemplary embodiment.

In the accompanying drawings, for clarity and/or description purposes, sizes and relative sizes of elements may be enlarged. Accordingly, the size and relative size of each element need not to be limited to those shown in the drawings. When the exemplary embodiments may be implemented differently, a specific process sequence may be different from the described sequence. For example, two consecutively described processes may be performed substantially simultaneously or in an order contrary to the described order. In addition, the same reference numerals represent the same elements.

When an element is described as being “on”, “connected to” or “coupled to” another element, the element may be directly on the another element, directly connected to the another element, or directly coupled to the another element, or an intermediate element may be provided. However, when an element is described as being “directly on”, “directly connected to” or “directly coupled to” another element, no intermediate element is provided. Other terms and/or expressions used to describe relationships between elements, for example, “between” and “directly between”, “adjacent to” and “directly adjacent to”, “on” and “directly on”, and so on, should be interpreted in a similar manner. In addition, the term “connection” may refer to a physical connection, an electrical connection, a communicative connection, and/or a fluid connection. In addition, X-axis, Y-axis and Z-axis are not limited to three axes of a rectangular coordinate system, and may be interpreted in a broader meaning. For example, the X-axis, the Y-axis and the Z-axis may be perpendicular to each other, or may represent different directions that are not perpendicular to each other. For the objective of the present disclosure, “at least one of X, Y and Z” and “at least one selected from a group consisting of X, Y and Z” may be interpreted as only X, only Y, only Z, or any combination of two or more of X, Y and Z, such as XYZ, XYY, YZ and ZZ. As used herein, the term “and/or” includes any and all combinations of one or more of the listed related items.

It should be noted that although the terms “first”, “second”, and so on may be used here to describe various elements, these elements should not be limited by these terms. Rather, these terms are used to distinguish one element from another element. For example, without departing from the scope of the exemplary embodiments, a first element may be named as a second element, and similarly, a second element may be named as a first element.

Herein, an inorganic LED refers to a light emitting element made from an inorganic material, and LED represents an inorganic light emitting element different from OLED. Specifically, the inorganic light emitting element may include Mini LED and micro light emitting diode (Micro LED). Mini LED refers to a small light emitting diode with a grain size between Micro LED and traditional LED. Typically, the grain size of Mini LED may range from 100 microns to 300 microns.

Herein, the light emitting element may include a light emitting diode, such as Mini LED, Micro LED, etc. In addition, the light emitting element may further include a sensor element or a micro integrated circuit chip, etc.

A PM driving mode refers to a passive matrix driving mode, in which anodes (P-electrodes) of each column of LED pixels in an array are connected to a column scanning line (Data Current Source), and cathodes (N-electrodes) of each row of LED pixels are connected to a row scanning line (Scan Line). When particular $Y^{th}$ column scanning line and $X^{th}$ row scanning line are selected, an LED pixel at an intersection (X, Y) may be illuminated. In this way, a high-speed progressive scanning may be performed on an entire screen to display images.

Herein, for convenience of description, a component formed by assembling a light emitting module and a display panel is called a display device, that is, the expression “display device” includes a light emitting module, a display panel, and a frame that combines the light emitting module and the display panel.

FIG. 1 is a local structural schematic diagram of a display device according to embodiments of the present disclosure. For example, the display device shown in FIG. 1 may be a liquid crystal display device. Referring to FIG. 1, a display device 1 may include a light emitting module 2, a display panel 4 such as a liquid crystal display panel, a back frame 5, and a rubber frame 6.

It should be noted that herein, the “back frame” has characteristics of high strength and light weight, and may be made of a metal material such as aluminum alloy, which may increase a structural strength of the light emitting module and may support and protect the light emitting module; while the “rubber frame” refers to a frame connected to the back frame and used to support the display panel and other components, and the rubber frame is made of a soft and elastic material.

Figure 2:
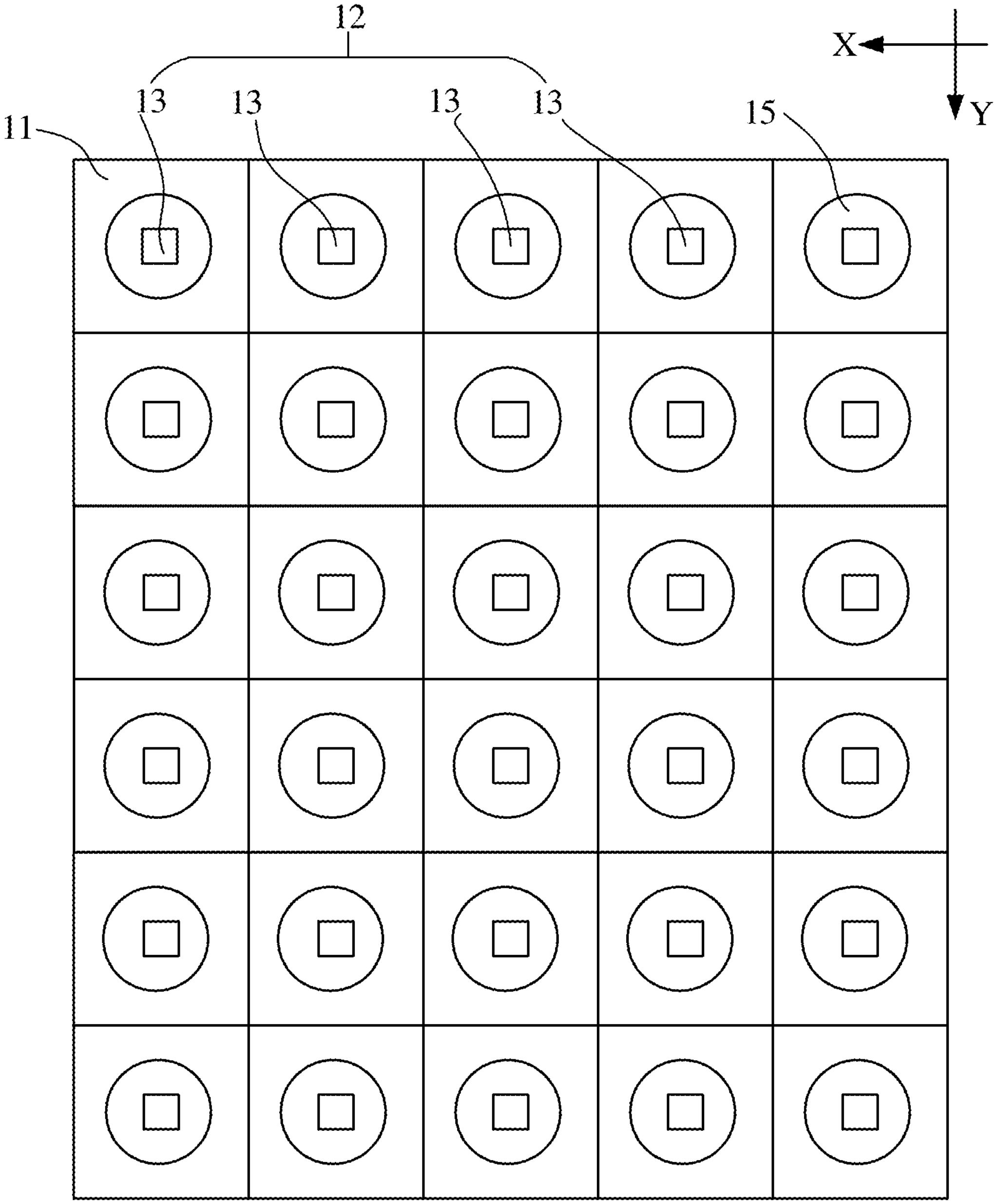
FIG. 2 is a schematic plan view of a light emitting module according to embodiments of the present disclosure.

In embodiments of the present disclosure, the light emitting module 2 may be a direct type light emitting module. FIG. 2 is a schematic plan view of a light emitting module according to embodiments of the present disclosure. Referring to FIG. 1 and FIG. 2 in combination, the light emitting module 2 may include a light emitting substrate. For example, the light emitting substrate may include a first substrate 11, a Mini LED chip array 12 provided on the first substrate 11, and an encapsulation layer 14 covering the Mini LED chip array 12. For example, a material of the first substrate may contain any of polyimide, PEN resin, or silicone resin. The encapsulation layer 14 includes a layered structure used to encapsulate the Mini LED chip array 12 on the first substrate 11. In some exemplary embodiments, an encapsulation adhesive is applied on a surface of the Mini LED chip in the light emitting substrate, and then dried to form the encapsulation layer 14. A material of the encapsulation adhesive may contain a transparent light-cured or heat-cured resin, that is, the material of the encapsulation layer 14 may be a transparent protection adhesive. In some embodiments, the encapsulation layer 14 may include a plurality of transparent protection structures 15.

It should be noted that in FIG. 1 and FIG. 2, the Mini LED chip is represented by a rectangular box. However, it may be understood that a cross-sectional shape of the Mini LED chip in embodiments of the present disclosure is not limited to a rectangle, and may be any shape such as a circle, a polygon, etc.

The Mini LED chip array 12 may include a plurality of Mini LED chips 13. The plurality of Mini LED chips 13 are spaced apart in a first direction X and a second direction Y, that is, they are arranged in an array on the first substrate 11. Each Mini LED chip 13 is electrically connected to the first substrate 11. The first substrate 11 is provided with solder pads corresponding to the Mini LED chips, and the Mini LED chips are fixedly connected to the corresponding solder pads to form the Mini LED chip array 12 on the first substrate 11. It should be understood that a density of the Mini LED chip array 12 depends on a luminous efficiency of the Mini LED chip, a power consumption requirement of the light emitting substrate, and a brightness requirement.

For example, the first direction X and the second direction Y are perpendicular to each other, and a third direction Z is perpendicular to both the first direction X and the second direction Y.

In embodiments of the present disclosure, an application of the Mini LED chip in the light emitting module is beneficial for achieving a more precise local dimming design of the light emitting module, achieving a high dynamic contrast and achieving a local dimming, so that the light emitting module may have better uniformity of light transmission, higher contrast, and more details of light and shade.

For example, the first substrate 11 may be connected directly to an inner surface of the back frame 5. As shown in FIG. 1, the light emitting module 2 may include a bonding portion 3. For example, the bonding portion 3 may include a double-sided adhesive. The first substrate 11 and the back frame 5 are respectively located on two sides of the bonding portion 3, and are respectively in contact with an upper surface and a lower surface of the bonding portion 3.

Continuing to refer to FIG. 1, the light emitting module 2 may further include an optical film group. For example, the optical film group may include a diffusion plate 23, a brightness enhancement film 24 and other optical films. It should be understood that the optical film group may further include other types of optical films, and the types of optical films included in the optical film group may be selected according to actual usage needs.

Referring to FIG. 1, the rubber frame 6 is used to carry the display panel 4. For example, a buffer element 7, such as foam, is provided between a carrying surface of the rubber frame 6 and a lower polarizer of the display panel 4. A part of the rubber frame 6 may overlap with the back frame 5. The back frame 5 may have a side portion. A side wall of the rubber frame 6 is combined with the side portion of the back frame 5 through a snap connection, a threaded connection, or the like.

For example, the light emitting module 2 may further include a color conversion layer 8. For example, the above-mentioned Mini LED chip 13 may be a Mini LED chip that emits blue light. The color conversion layer 8 may convert the blue light emitted by the Mini LED chip 13 into red light, green light, white light and light of other different colors. For example, the color conversion layer 8 may be located above the diffusion plate 23. Alternatively, the color conversion layer 8 may be located below the diffusion plate 23, which is not particularly limited in embodiments of the present disclosure.

Continuing to refer to FIG. 1, the optical film group is provided on a light emitting side of the light emitting substrate. For a display with a dimension of about 25 inches and above, it is needed to provide an optical distance OD between the light emitting substrate and the optical film group 2 in order to fully mix the light emitted from the Mini LED chip array 12 so as to achieve a uniform light emission and facilitate a display uniformity. Therefore, the light emitting module further includes a supporting structure 9 to ensure the optical distance OD between the light emitting substrate and the optical film group 2. For a display with a dimension of 25 inches and below, the optical distance OD may not be provided, which means that the light emitting substrate is in direct contact with the optical film group 2. Therefore, the light emitting module may not include the supporting structure 9.

It should be noted that in FIG. 1, the diffusion plate 23 and the brightness enhancement film 24 are schematically shown. However, the optical film group in embodiments of the present disclosure may further include other types of optical films. In addition, each of the diffusion plate 23 and the brightness enhancement film 24 may include a single layer of film or a plurality of layers of films.

A separation distance GAP is provided between the optical film group and the display panel 4, that is, the two are not in direct contact. For example, a cavity structure may be provided to ensure that the light emitted from the optical film group uniformly enters the display panel 4, so as to facilitate the display uniformity.

It may be understood that different types of light emitting elements may be provided on the first substrate of the light emitting module, and a distribution density of light emitting elements mentioned in embodiments of the present disclosure refers to a distribution density of a same type of light emitting elements with a greatest number in the light emitting module. For example, three types of light emitting elements may be provided on the first substrate of the light emitting module, including Mini LED chips, micro integrated circuit chips and temperature sensitive sensors, and the number of Mini LED chips is the greatest. Then, a distribution density of Mini LED chips 12 on the first substrate may be greater than or equal to 1 per 6 $mm^2$.

For example, when the distribution density of the Mini LED chips 13 increases, a thickness of the optical film in the optical film group, such as a thickness of the diffusion plate 23, may be reduced, so that an overall thickness of the light emitting module may be further reduced, and an overall weight of the light emitting module may be reduced accordingly.

In some embodiments, a light emitting unit only includes one Mini LED chip 13; in other embodiments, a light emitting unit may include a plurality of Mini LED chips 13, for example, it may include two or more Mini LED chips 13, which is not specifically limited here. In some embodiments, a plurality of Mini LED chips 13 included in a light emitting unit may be connected in series, in parallel, or in series-parallel, which is not specifically limited here.

Figure 3:
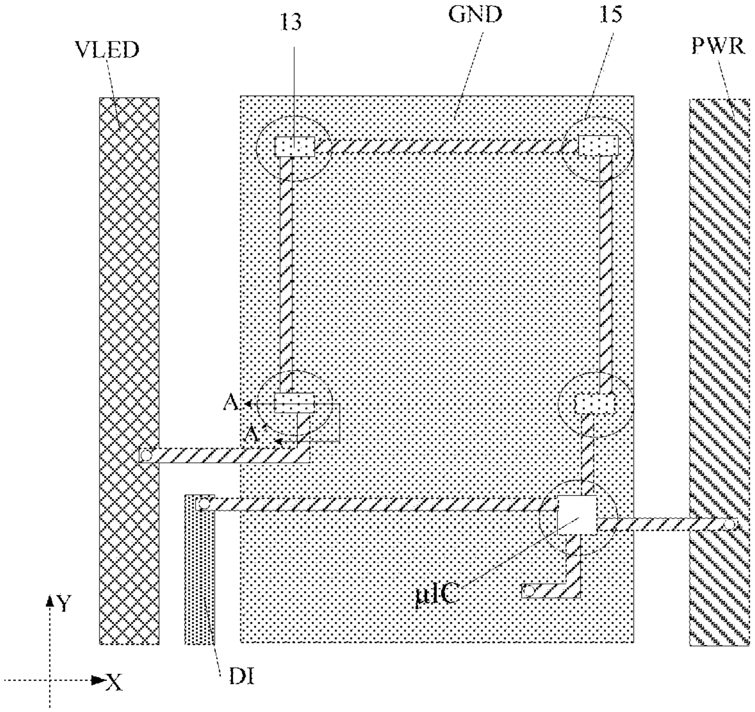
FIG. 3 is a plan view of a light emitting unit according to some exemplary embodiments of the present disclosure.

FIG. 3 is a plan view of a light emitting unit according to some exemplary embodiments of the present disclosure, in which a light emitting unit including four Mini LED chips 13 connected in series is schematically shown. For example, a micro integrated circuit μIC may provide signals to four Mini LED chips 13 in a light emitting unit. In some embodiments, a micro integrated circuit μIC may also provide signals to a plurality of light emitting units. On the light emitting substrate including the micro integrated circuits μIC, a transparent protection structure 15 is provided on a side of the Mini LED chip 13 away from the light emitting substrate. The transparent protection structure 15 may protect the encapsulated micro integrated circuit μIC. In addition, for convenience of production, a production requirement for the transparent protection structure 15 above the micro integrated circuit μIC is the same as a production requirement for the transparent protection structure 15 above the Mini LED chip 13, and the two are formed in one and same process flow.

It may be understood that in embodiments of the present disclosure, the light emitting substrate of the light emitting module includes a light emitting region and a peripheral region. All Mini LED chips 13 and micro integrated circuits μIC are provided in the light emitting region, and the Mini LED chip 13 and the micro integrated circuit μIC are electrically connected to the corresponding solder pads on the light emitting substrate through a series of processes such as picking, transferring, and fixing. The peripheral region is used to be connected to an external driving circuit, such as a flexible printed circuit (FPC) or a printed circuit board (PCB). For example, a binding pad 107 may be provided in the peripheral region to electrically connect to a golden finger structure on the circuit board.

Figure 4:
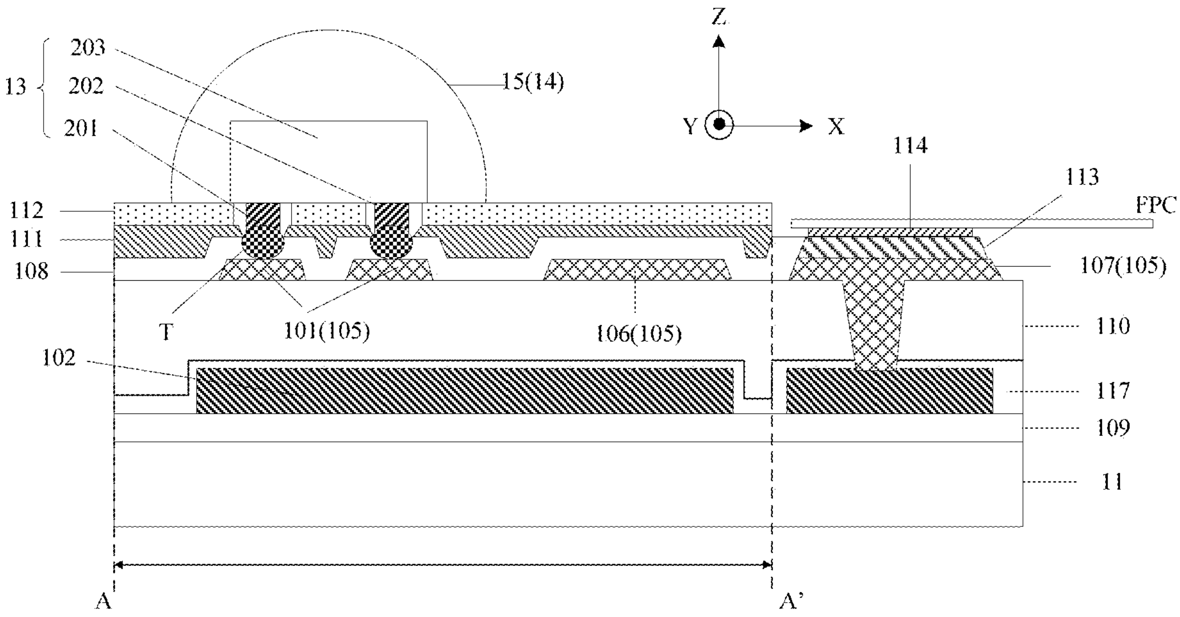
FIG. 4 is a schematic diagram of a cross-sectional structure of a light emitting module according to embodiments of the present disclosure taken along line AA' in FIG. 3.

FIG. 4 is a schematic diagram of a cross-sectional structure of a light emitting module according to embodiments of the present disclosure taken along line AA' in FIG. 3. Referring to FIG. 2 to FIG. 4 in combination, the Mini LED chip 13 includes a light emitting portion 203 and two pins 201 and 202 (N pad and P pad, respectively), which are respectively connected to solder pads 101 through solder pastes T. Each solder pad 101 is then connected according to a position of the Mini LED chip 13 in an electrical circuit. Specifically, in FIG. 3, the P pad of a lower left Mini LED chip 13 is connected to a driving voltage line VLED, the N pad of the lower left Mini LED chip 13 is connected to the P pad of an upper left Mini LED chip 13, the N pad of the upper left Mini LED chip 13 is connected to the P pad of an upper right Mini LED chip 13, the N pad of the upper right Mini LED chip 13 is connected to the P pad of the lower right Mini LED chip 13, and the N pad of the lower right Mini LED chip 13 is connected to an output terminal of the micro integrated circuit μIC. In some embodiments, the micro integrated circuit μIC may have a plurality of pins, such as four pins, which are respectively connected to the solder pads on the light emitting substrate through solder pastes. The solder pads are then connected to a power line PWR, a common voltage line GND, an address line DI, and the Mini LED chip 13 in the corresponding light emitting diode unit, respectively.

In some embodiments, referring to FIG. 2 to FIG. 4, the light emitting module may further include a first conductive layer 102, which is typically used to provide various signal lines, such as the common voltage line GND, the driving voltage line VLED, the power line PWR, the address line DI, etc. Optionally, a thickness of the first conductive layer 102 is about 1.5 μm to 7 μm, and a material of the first conductive layer 102 may include copper. For example, it is possible to form stacked materials such as MoNb/Cu/MoNb by sputtering. A material on a side close to the first substrate 11 in the stacked layers is MoNb with a thickness of about 300 Å, which is mainly used to improve an adhesion between the film layer and the first substrate 11. A middle material of the stacked layers is Cu, which is a preferred material for an electrical signal transmission channel. A material on a side away from the first substrate 11 is MoNb with a thickness of about 200 Å, which may be used to protect the middle layer and prevent an exposure and oxidation of a surface of the middle layer with low resistivity. As a thickness formed by a single sputtering generally does not exceed 1 μm, a production of the first conductive layer 102 with a thickness over 1 μm requires multiple sputtering. In addition, the first conductive layer 102 may also be formed by electroplating. Specifically, a seed layer may be first formed using MoNiTi to increase a nucleation density of metal grains in a subsequent electroplating process. Then, copper with low resistivity may be made through electroplating, and then an anti-oxidation layer may be made using MoNiTi material. Optionally, a surface of the first conductive layer 102 on a side away from the first substrate 11 may be covered by a first insulation layer 117 to ensure reliability and stability of an electrical path.

In some embodiments, referring to FIG. 2 to FIG. 4, the light emitting module may further include a second conductive layer 105, which is typically used to provide the solder pads and connecting leads 106. Optionally, a film thickness of the second conductive layer 105 is about 6000 Å. The solder pads are used to bind various electrical elements. For example, the solder pads may include the solder pad 101 located in the light emitting region and used to install the Mini LED chip 13, and/or a solder pad used to install a functional element such as a micro integrated circuit chip or a sensor, and a binding pad 107 located in the peripheral region and used to be connected to the circuit board. A surface of the solder pad on a side away from the first substrate 11 needs to be partially exposed before it is connected to the light emitting element. In order to prevent a possible oxidation when the solder pad is exposed to air during a process from manufacturing the substrate to providing the light emitting element on the substrate, an anti-oxidation material layer may be provided only in the exposed surface region of the solder pad, that is, the surface of the solder pad region may have an additional layer of structure than a region where the connecting lead 106 is located. Alternatively, the second conductive layer 105 as a whole may be provided as a stacked layer structure with at least two layers, in which a film material away from the first substrate 11 is an anti-oxidation metal or alloy material. Specifically, the second conductive layer 105 may be formed by a stacked layer structure such as MoNb/Cu/CuNi. A bottom layer material MoNb in the stacked layers is mainly used to increase the adhesion, a middle layer Cu in the stacked layers is mainly used to transmit electrical signals due to its low resistivity, and a top layer CuNi in the stacked layers may prevent oxidation of the middle layer and ensure a firmness of a connection with the light emitting element. The connecting leads 106 may include a first lead 1061 extending in the first direction X and a second lead 1062 extending in the second direction Y, and a surface of the first lead 1061 away from the first substrate 11 and a surface of the second lead 1062 away from the first substrate 11 may be covered by the second insulation layer 108 to ensure the reliability and stability of the electrical path.

In some embodiments, as shown in FIG. 4, the light emitting module may further include a buffer layer 109 located between the first substrate 11 and the first conductive layer 102, a first planarization layer 110 located between a first insulation layer 117 and the second conductive layer 105, a second planarization layer 111 and a reflective layer 112 that are sequentially located on a side of a second insulation layer 108 away from the second conductive layer 105, a transparent electrode 113 located on the binding pad 107 in the peripheral region, and an anisotropic conductive adhesive 114 located between the transparent electrode 113 and a flexible printed circuit FPC. The buffer layer 109 may avoid an influence of impurities in the first substrate 11 on a conductivity of the first conductive layer 102. The first planarization layer 110 may provide a flat surface for the production of the second conductive layer 105. The second planarization layer 111 may provide a flat surface for a subsequent binding of the Mini LED chip 13. The reflective layer 112 may be made of white ink to improve a reflectivity of the light emitting substrate so as to reduce a light loss. The transparent electrode 113 and the anisotropic conductive adhesive 114 are used to achieve an electrical connection between the binding pad 107 in the peripheral region and the flexible printed circuit FPC.

Figure 5:
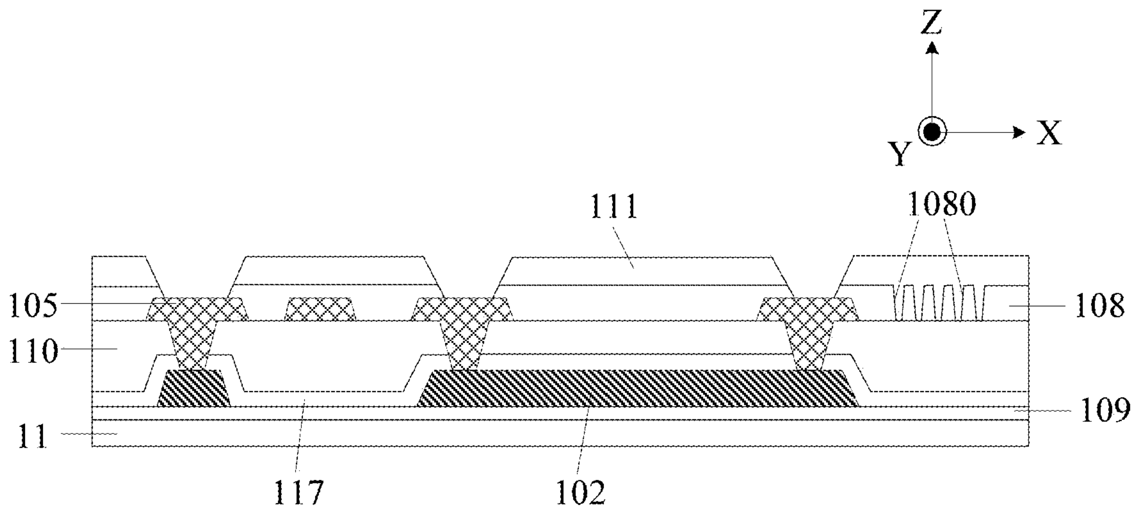
FIG. 5 is a schematic diagram of a cross-sectional structure of a light emitting module according to some other embodiments of the present disclosure taken along line AA' in FIG. 3.

FIG. 5 is a schematic diagram of a cross-sectional structure of a light emitting module according to some other embodiments of the present disclosure taken along line AA' in FIG. 3. In order to clearly show the film layer structure on the light emitting substrate, the Mini LED chip is not shown in FIG. 5. As shown in FIG. 5, the light emitting substrate of the light emitting module may include: a first substrate 11; a buffer layer 109 located on the first substrate 11; a first conductive layer 102 located on a side of the buffer layer 109 away from the first substrate 11; a first insulation layer 117 located on a side of the first conductive layer 102 away from the first substrate 11; a first planarization layer 110 located on a side of the first insulation layer 117 away from the first substrate 11; a second conductive layer 105 located on a side of the first planarization layer 110 away from the first substrate 11; a second insulation layer 108 located on a side of the second conductive layer 105 away from the first substrate 11; and a second planarization layer 111 located on a side of the second insulation layer 108 away from the first substrate 11.

As shown in FIG. 5, the second insulation layer 108 is located between the first planarization layer 110 and the second planarization layer 111. In a case that the second planarization layer 111 is made of an organic insulation material, a plurality of vent holes 1080 may be provided in the second insulation layer 108. The plurality of vent holes 1080 respectively expose a part of the first planarization layer 110 below. In a process of manufacturing the light emitting substrate, a gas accumulated in the first planarization layer 110 may be released through the vent holes 1080, so that warping, peeling and other problems of the film layers of the light emitting substrate may be avoided, and a product yield may be increased.

For example, in the embodiment shown in FIG. 5, a plurality of vent holes 1080 are provided. However, this is just schematic and not a limitation on embodiments of the present disclosure. In other embodiments, more or fewer vent holes may be provided.

Figure 6A:
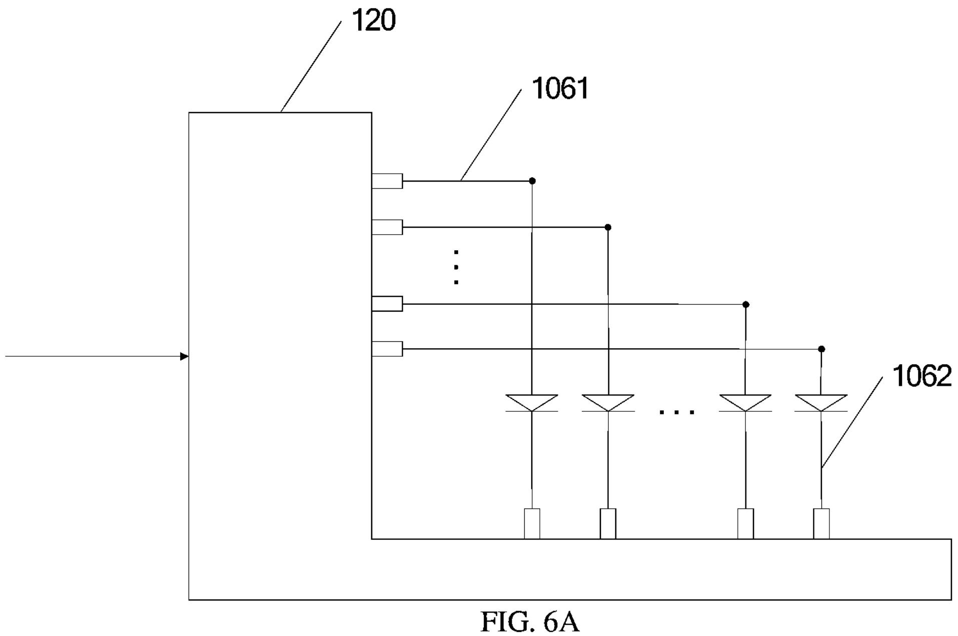
FIG. 6A is a schematic diagram of an IC drive architecture in the related art.
Figure 6B:
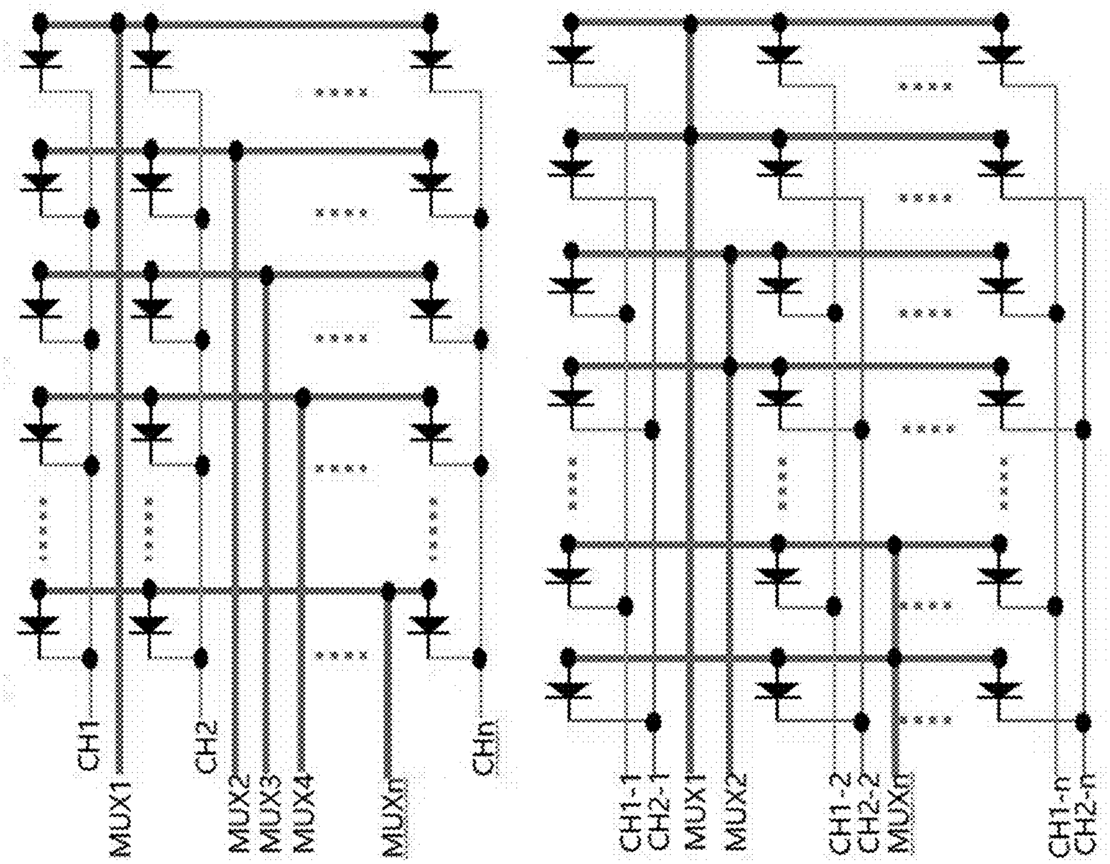
FIG. 6B is a schematic diagram of a double-layer wiring design in the related art.
Figure 6C:
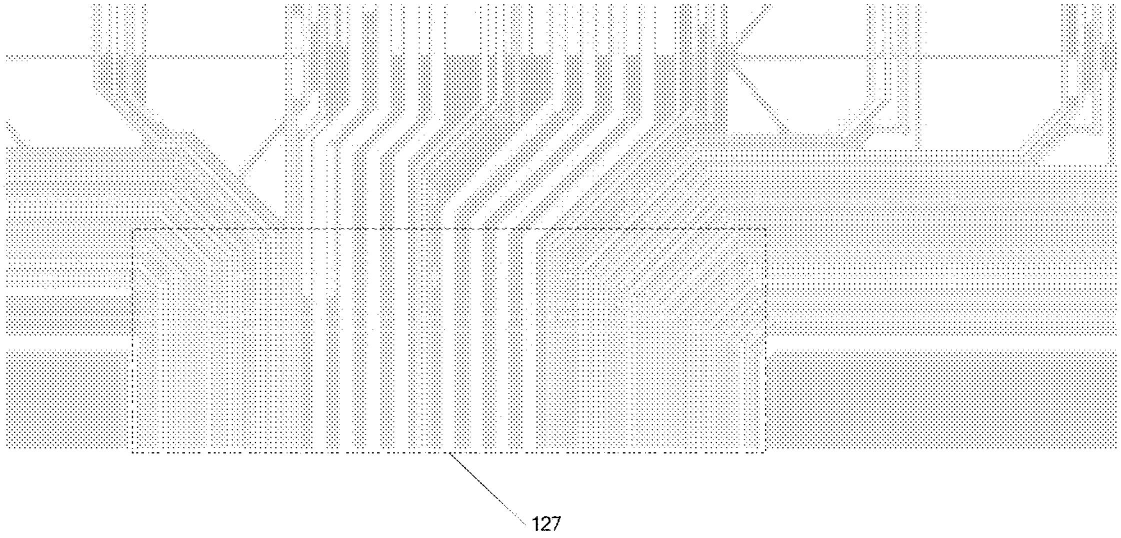
FIG. 6C is a schematic diagram of a fan out region in the related art.

FIG. 6A is a schematic diagram of an IC drive architecture in the related art. FIG. 6B is a schematic diagram of a double-layer wiring design in the related art. FIG. 6C is a schematic diagram of a fan out region in the related art.

As shown in FIG. 6A, in a PM solution applied by current local dimming, the LED driving chip 120 is row and column integrated. For example, an input of the LED drive IC 120 includes, for example, digital voltage DVDD, serial peripheral interface SPI, vertical synchronization signal VSYNC, and power supply PVDD, etc., and all rows and columns in the light emitting element array are uniformly driven through the LED drive IC 120. The LED drive IC 120 may drive the scanning of each row in the light emitting element array through a plurality of first leads 1061, and drive a channel signal transmission of each column in the light emitting element array through a plurality of second leads 1062. Therefore, all LED high currents need to pass through the LED drive IC 120, causing a large power consumption of the IC and an increase of a temperature. It may be understood that the light emitting element array may be, for example, the Mini LED chip array 12, or may be other types of light emitting element arrays, which are not limited in embodiments of the present disclosure.

Figure 7:
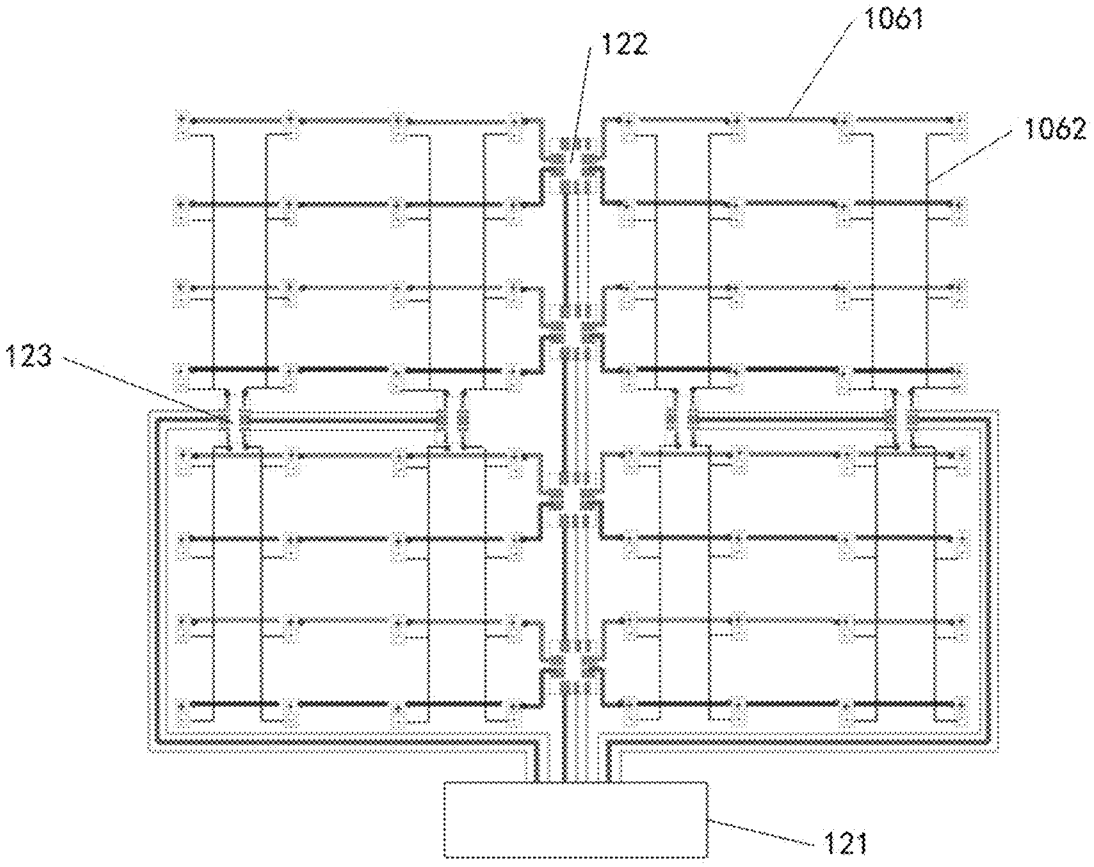
FIG. 7 is a schematic diagram of a drive architecture of a light emitting element array according to some exemplary embodiments of the present disclosure.

In order to solve the problem of concentrated power consumption mentioned above, some exemplary embodiments of the present disclosure provide a light emitting module and a display device including the light emitting module. For example, some embodiments of the present disclosure provide a light emitting module and a display device. FIG. 7 is a schematic diagram of a drive architecture of a light emitting element array according to some exemplary embodiments of the present disclosure. Referring to FIG. 7, the light emitting module includes: a first substrate; a light emitting element array provided on the first substrate, where the light emitting element array includes a plurality of light emitting elements arranged in an array in a row direction and a column direction, and each of the plurality of light emitting elements includes a first electrode 124 and a second electrode 125; a plurality of row driving chips 122 provided on the first substrate, where at least one of the plurality of row driving chips 122 is used to drive at least one row of light emitting elements; and a plurality of column driving chips 123 provided on the first substrate, where at least one of the plurality of column driving chips 123 is used to drive at least one column of light emitting elements. At least one of the plurality of row driving chips 122 and at least one of the plurality of column driving chips 123 are spaced apart in the row direction and the column direction. At least one of the plurality of row driving chips 122 is electrically connected to the first electrodes 124 of at least one row of light emitting elements, and at least one of the plurality of column driving chips 123 is electrically connected to the second electrodes 125 of at least one column of light emitting elements.

In embodiments of the present disclosure, a plurality of row driving chips 122 and a plurality of column driving chips 123 are respectively provided for rows and columns of light emitting elements in the light emitting element array, and the row driving chips 122 and the column driving chips 123 are spaced apart so that the scanning of the rows of light emitting elements in the light emitting element array is driven and achieved by the plurality of row driving chips 122, and input of channel signals (digital signals) of the columns of light emitting elements is driven and achieved by the plurality of column driving chips 123. When driving one or more rows of light emitting elements, the row driving chip 122 is electrically connected to the one or more rows of light emitting elements through the first electrodes 124, and the first electrodes 124 are, for example, anodes or positive electrodes. When driving one or more columns of light emitting elements, the column driving chip 123 is electrically connected to the one or more columns of light emitting elements through the second electrodes 125, and the second electrodes 125 are, for example, cathodes or negative electrodes. In embodiments of the present disclosure, a driving current of the light emitting element is greater than or equal to 1 mA. For example, the light emitting element may include Mini LED. In this case, if a single driving chip is used to provide driving currents to the light emitting elements, a power consumption of the single driving chip may be very high. In embodiments of the present disclosure, the rows and columns of light emitting elements in the light emitting element array may be driven by the row driving chips 122 and the column driving chips 123 respectively, then the power consumption may be evenly distributed to the row driving chips 122 and the column driving chips 123, which is conducive to an overall heat dissipation of the back plate and a temperature reduction, so that a user experience and service life of the product may be improved.

Figure 8A:
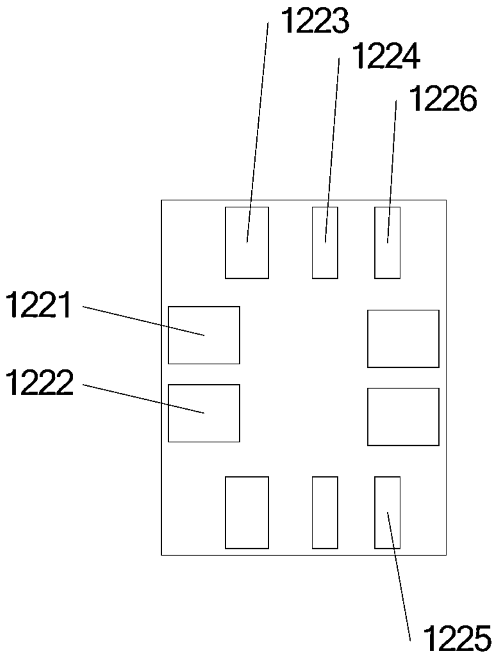
FIG. 8A is a schematic diagram of a port layout of a row driving chip according to some exemplary embodiments of the present disclosure.
Figure 8B:
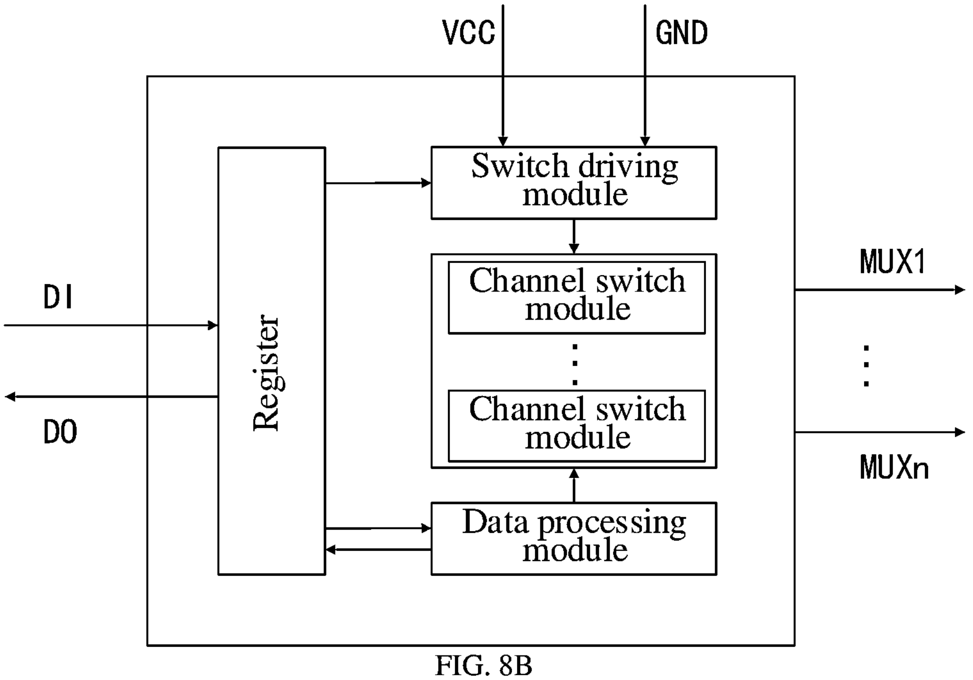
FIG. 8B is a schematic diagram of an internal module structure of a row driving chip according to some exemplary embodiments of the present disclosure.
Figure 8C:
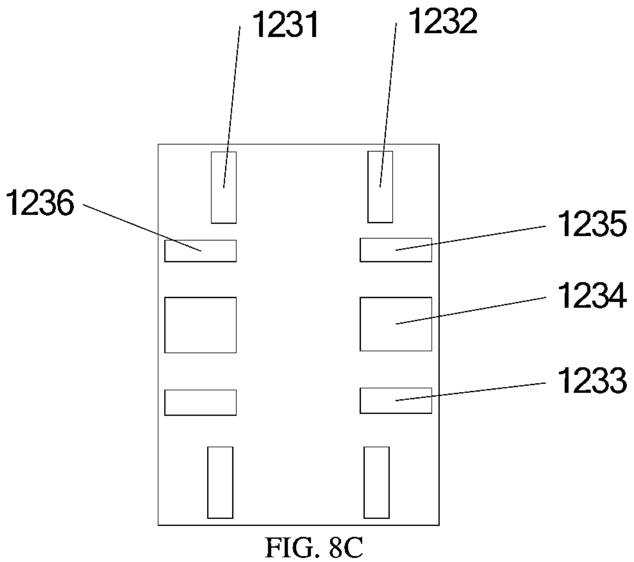
FIG. 8C is a schematic diagram of a port layout of a column driving chip according to some exemplary embodiments of the present disclosure.
Figure 8D:
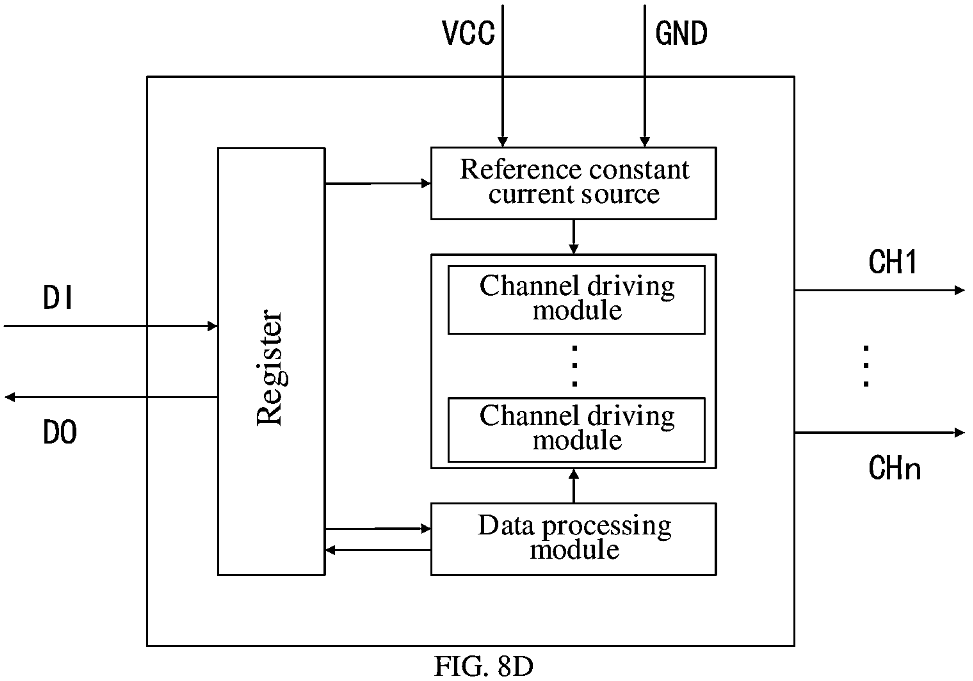
FIG. 8D is a schematic diagram of an internal module structure of a column driving chip according to some exemplary embodiments of the present disclosure.

FIG. 8A is a schematic diagram of a port layout of a row driving chip according to some exemplary embodiments of the present disclosure. FIG. 8B is a schematic diagram of an internal module structure of a row driving chip according to some exemplary embodiments of the present disclosure. FIG. 8C is a schematic diagram of a port layout of a column driving chip according to some exemplary embodiments of the present disclosure. FIG. 8D is a schematic diagram of an internal module structure of a column driving chip according to some exemplary embodiments of the present disclosure.

As shown in FIG. 7, the plurality of row driving chips 122 are arranged in a column and spaced apart in the column direction; and/or the plurality of column driving chips 123 are arranged in a row and spaced apart in the row direction.

In some exemplary embodiments of the present disclosure, the light emitting module includes, for example, four row driving chips 122 and four column driving chips 123. Each row driving chip 122 may drive two rows of light emitting elements, and each column driving chip 123 may drive two columns of light emitting elements. A control of the light emitting element array may be precise to four light emitting elements at intersections of two rows and two columns.

It may be understood that the number of row driving chips 122 and column driving chips 123 may also be other than those shown in FIG. 7. The number of row driving chips 122 may be the same as or different from the number of column driving chips 123. That is, a row driving chip 122 may drive one row of light emitting elements or a plurality of rows of light emitting elements. Similarly, a column driving chip 123 may drive one column of light emitting elements or a plurality of columns of light emitting elements. There is no fixed corresponding relationship between the number of row driving chips 122 and the number of column driving chips 123. In practical applications, the number of row driving chips 122 and the number of column driving chips 123 need to be determined according to various factors such as product sizes, line current limitations, and resolution requirements, etc.

As shown in FIG. 7 and FIG. 8A, the light emitting module further includes, for example, a plurality of first wires provided on the first substrate, and at least one of the plurality of first wires extends in the row direction. At least one row driving chip 122 includes a first scanning signal terminal 1221, which is electrically connected to the first electrodes 124 of at least part of light emitting elements in at least one row of light emitting elements through the plurality of first wires.

For example, as shown in FIG. 7 and FIG. 8A, at least one row driving chip 122 further includes a second scanning signal terminal 1222, which is electrically connected to the first electrodes 124 of at least part of light emitting elements in at least one row of light emitting elements through the plurality of first wires.

For one and same row driving chip 122, the first scanning signal terminal 1221 is electrically connected to the first electrodes 124 of at least part of light emitting elements in an $i^{th}$ row of light emitting elements, the second scanning signal terminal 1222 is electrically connected to the first electrodes 124 of at least part of light emitting elements in an $(i+1)^{th}$ row of light emitting elements, where i is a positive integer greater than or equal to 1.

Specifically, the row driving chip 122 includes, for example, at least two first scanning signal terminals 1221 and at least two second scanning signal terminals 1222. One of the at least two first scanning signal terminals 1221 is electrically connected to the first electrodes 124 of a part of light emitting elements in the $i^{th}$ row of light emitting elements, and another of the at least two first scanning signal terminals 1221 is electrically connected to the first electrodes 124 of another part of light emitting elements in the $i^{th}$ row of light emitting elements; and/or one of the at least two second scanning signal terminals 1222 is electrically connected to the first electrodes 124 of a part of light emitting elements in the $(i+1)^{th}$ row of light emitting elements, and another of the at least two second scanning signal terminals 1222 is electrically connected to the first electrodes 124 of another part of light emitting elements in the $(i+1)^{th}$ row of light emitting elements.

In some exemplary embodiments of the present disclosure, the first wire is, for example, the first lead 1061, the first scanning signal terminal 1221 is, for example, MUX1, the second scanning signal terminal 1222 is, for example, MUX2, and the first electrode 124 is, for example, an anode or positive electrode. The plurality of first leads 1061 extend in the row direction, and FIG. 7 includes, for example, sixteen first leads 1061. Each row driving chip 122 includes, for example, two first scanning signal terminals 1221 on an upper side. Two first scanning signal terminals 1221 on the upper side of a first one of the row driving chips 122 from top to bottom may drive eight light emitting elements in a first row through a first lead 1061 respectively, two first scanning signal terminals 1221 on the upper side of a second one of the row driving chips 122 from top to bottom may drive eight light emitting elements in a third row, two first scanning signal terminals 1221 on the upper side of a third one of the row driving chips 122 from top to bottom may drive eight light emitting elements in a fifth row, and two first scanning signal terminals 1221 on the upper side of a fourth one of the row driving chips 122 from top to bottom may drive eight light emitting elements in a seventh row. Each row driving chip 122 may further include, for example, two second scanning signal terminals 1222 on a lower side. Two second scanning signal terminals 1222 on the lower side of the first one of the row driving chips 122 from top to bottom may drive eight light emitting elements in a second row through a first lead 1061 respectively, two second scanning signal terminals 1222 on the lower side of the second one of the row driving chips 122 from top to bottom may drive eight light emitting elements in a fourth row, two second scanning signal terminals 1222 on the lower side of the third one of the row driving chips 122 from top to bottom may drive eight light emitting elements in a sixth row, and two second scanning signal terminals 1222 on the lower side of the fourth one of the row driving chips 122 from top to bottom may drive eight light emitting elements in an eighth row.

It may be understood that each row driving chip 122 may include one or more first scanning signal terminals 1221 and/or second scanning signal terminals 1222, which may be specifically determined according to the number of row driving chips 122, the number of rows in the light emitting element array to be driven, and positions of the row driving chips 122, which is not limited in the present disclosure. The first scanning signal terminal 1221 may also be located on the lower side of the row driving chip 122, that is, the second scanning signal terminal 1222 may also be located on the upper side of the row driving chip 122. The row driving chip 122 may be located in the middle of the light emitting element array, or on left and right sides of the light emitting element array. Depending on the position of the row driving chip 122, the first scanning signal terminal 1221 or the second scanning signal terminal 1222 may drive a part of light emitting elements in a row of light emitting elements, or drive the entire row of light emitting elements.

For example, as shown in FIG. 7 and FIG. 8C, the light emitting module further includes a plurality of second wires provided on the first substrate, and at least one of the plurality of second wires extends in the column direction. At least one column driving chip 123 includes a first channel signal terminal 1231, which is electrically connected to the second electrodes 125 of at least part of light emitting elements in at least one column of light emitting elements through the plurality of second wires.

For example, as shown in FIG. 7 and FIG. 8C, at least one column driving chip 123 further includes a second channel signal terminal 1232, which is electrically connected to the second electrodes 125 of at least part of light emitting elements in at least one column of light emitting elements through the plurality of second wires.

For one and same column driving chip 123, the first channel signal terminal 1231 is electrically connected to the second electrodes 125 of at least part of light emitting elements in a $j^{th}$ column of light emitting elements, the second channel signal terminal 1232 is electrically connected to the second electrodes 125 of at least part of light emitting elements in a $(j+1)^{th}$ column of light emitting elements, and j is a positive integer greater than or equal to 1.

Specifically, the column driving chip 123 includes at least two first channel signal terminals 1231 and at least two second channel signal terminals 1232. One of the at least two first channel signal terminals 1231 is electrically connected to the second electrodes 125 of a part of light emitting elements in the $j^{th}$ column of light emitting elements, and another of the at least two first channel signal terminals 1231 is electrically connected to the second electrodes 125 of another part of light emitting elements in the $j^{th}$ column of light emitting elements; and/or one of the at least two second channel signal terminals 1232 is electrically connected to the second electrodes 125 of a part of light emitting elements in the $(j+1)^{th}$ column of light emitting elements, and another of the at least two second channel signal terminals 1232 is electrically connected to the second electrodes 125 of another part of light emitting elements in the $(j+1)^{th}$ column of light emitting elements.

In some exemplary embodiments of the present disclosure, the second wire is, for example, the second lead 1062, the first channel signal terminals 1231 are, for example, CH1 and CH3, the second channel signal terminals 1232 are, for example, CH2 and CH4, and the second electrode 125 is, for example, a cathode or negative electrode. A plurality of second leads 1062 extend in the column direction, and FIG. 7 includes, for example, sixteen second leads 1062. Each column driving chip 123 includes, for example, two first channel signal terminals 1231 on a left side. Two first channel signal terminals 1231 on the left side of a first one of the column driving chips 123 from left to right may drive eight light emitting elements in a first column through a second lead 1062 respectively, two first channel signal terminals 1231 on the left side of a second one of the column driving chips 123 from left to right may drive eight light emitting elements in a third column, two first channel signal terminals 1231 on the left side of a third one of the column driving chips 123 from left to column may drive eight light emitting elements in a fifth column, and two first channel signal terminals 1231 on the left side of a fourth one of the column driving chips 123 from left to right may drive eight light emitting elements in a seventh column. Each column driving chip 123 may further include, for example, two second channel signal terminals 1232 on a right side. Two second channel signal terminals 1232 on the right side of the first one of the column driving chips 123 from left to right may drive eight light emitting elements in a second column through a second lead 1062 respectively, two second channel signal terminals 1232 on the right side of the second one of the column driving chips 123 from left to right may drive eight light emitting elements in a fourth column, two second channel signal terminals 1232 on the right side of the third one of the column driving chips 123 from left to right may drive eight light emitting elements in a sixth column, and two second channel signal terminals 1232 on the right side of the fourth one of the column driving chips 123 from left to right may drive eight light emitting elements in an eighth column.

It may be understood that each column driving chip 123 may include one or more first channel signal terminals 1231 and/or second channel signal terminals 1232, which may be specifically determined according to the number of column driving chips 123, the number of columns in the light emitting element array to be driven, and positions of column driving chips 123, which is not limited in the present disclosure. The first channel signal terminal 1231 may also be located on the right side of the column driving chip 123, and the second channel signal terminal 1232 may also be located on the left side of the column driving chip 123. The column driving chip 123 may be located in the middle of the light emitting element array, or on the upper and lower sides of the light emitting element array. Depending on the position of the column driving chip 123, the first channel signal terminal 1231 or the second channel signal terminal 1232 may drive a part of light emitting elements in a column of light emitting elements, or drive the entire column of light emitting elements.

For example, as shown in FIG. 7 and FIG. 8A, the row driving chip 122 further includes a first voltage signal terminal 1223, a first grounding terminal 1224, a first input terminal 1225, and a first output terminal 1226. The light emitting module further includes an external driving chip 121 provided on the first substrate. The plurality of row driving chips 122 include a first row driving chip 122 closest to the external driving chip 121. The first voltage signal terminal 1223, the first grounding terminal 1224 and the first input terminal 1225 of the first row driving chip 122 are electrically connected to the external driving chip 121 respectively through a first driving line, a first grounding line and a first input signal line. The first voltage signal terminal 1223, the first grounding terminal 1224 and the first output terminal 1226 of a row driving chip 122 in the plurality of row driving chips 122 are electrically connected to the first voltage signal terminal 1223, the first grounding terminal 1224 and the first input terminal 1225 of another row driving chip 122 adjacent to the row driving chip 122 in the column direction respectively through a first voltage signal lead, a first grounding lead and a first signal lead. The first voltage signal lead, the first grounding lead and the first signal lead respectively extend in the column direction.

In some exemplary embodiments of the present disclosure, the first voltage signal terminal 1223 is, for example, VLED, the first grounding terminal 1224 is, for example, GND, the first input terminal 1225 is, for example, DI, and the first output terminal 1226 is, for example, DO. The external driving chip 121 is provided, for example, on a side of a fan out region 127 in which outgoing lines are concentrated, then the fourth one of the row driving chips 122 from top to bottom is the first row driving chip 122 closest to the external driving chip 121. The first voltage signal terminal 1223, the first grounding terminal 1224 and the first input terminal 1225 of the fourth one of the row driving chips 122 are electrically connected to the external driving chip 121 respectively through the first driving line, the first grounding line and the first input signal line. The first voltage signal terminal 1223, the first grounding terminal 1224 and the first output terminal 1226 of the fourth one of the row driving chips 122 are further electrically connected to the first voltage signal terminal 1223, the first grounding terminal 1224 and the first input terminal 1225 of the third one of the row driving chips 122 above respectively through a first voltage signal lead, a first grounding lead and a first signal lead. In a same manner, the first voltage signal lead, the first grounding lead and the first signal lead respectively extend from the third one of the row driving chips 122 to the second one of the row driving chips 122 in the column direction, and then from the second one of the row driving chips 122 to the first one of the row driving chips 122, so as to achieve a connection of electrical signals of all rows of the light emitting element array.

As shown in FIG. 8B, the row driving chip 122 includes, for example, a register, a switch driving module, a channel switch module and a data processing module that are communicatively connected in sequence. The register is used to connect the first input terminal 1225 and the first output terminal 1226, for example, to store scanning instructions. The switch driving module is used to connect the first voltage signal terminal 1223 and the first grounding terminal 1224, for example, to control on/off of an input circuit voltage and a ground voltage. The channel switch module is used to connect various scanning signal terminals, such as MUX1 . . . MUXn, to control on/off of each row of scanning signals. The data processing module is used to process data that controls the row scanning.

For example, as shown in FIG. 7 and FIG. 8C, the column driving chip 123 further includes a second voltage signal terminal 1233, a second grounding terminal 1234, a second input terminal 1235, and a second output terminal 1236. The plurality of column driving chips 123 include a first column driving chip 123 and a second column driving chip 123 that are closest to a side edge of the first substrate in the column direction. The second voltage signal terminal 1233, the second grounding terminal 1234 and the second input terminal 1235 of the first column driving chip 123 are electrically connected to the external driving chip 121 respectively through a second driving line, a second grounding line and a second input signal line. The second voltage signal terminal 1233, the second grounding terminal 1234 and the second input terminal 1235 of the second column driving chip 123 are electrically connected to the external driving chip 121 respectively through a third driving line, a third grounding line and a third input signal line.

Each of the second driving line, the second grounding line and the second input signal line includes a first sub-portion, a second sub-portion, a third sub-portion and a fourth sub-portion that are connected in sequence. The first sub-portion is connected to the external driving chip 121, the fourth sub-portion is connected to the column driving chip 123, the second sub-portion extends in the row direction, and the third sub-portion extends in the column direction. The second sub-portion and the third sub-portion of each of the second driving line, the second grounding line and the second input signal line are located in a peripheral region of the first substrate.

In some exemplary embodiments of the present disclosure, the second voltage signal terminal 1233 is, for example, VCC, the second grounding terminal 1234 is, for example, GND, the second input terminal 1235 is, for example, DI, and the second output terminal 1236 is, for example, DO. The first one and the fourth one of the column driving chips 123 from left to right are the first column driving chip 123 and the second column driving chip 123 that are closest to the side edge of the first substrate. The second voltage signal terminal 1233, the second grounding terminal 1234 and the second input terminal 1235 of the first one of the column driving chips 123 are electrically connected to the external driving chip 121 respectively through the second driving line, the second grounding line and the second input signal line. The second voltage signal terminal 1233, the second grounding terminal 1234 and the second input terminal 1235 of the fourth one of the column driving chips 123 are connected to the external driving chip 121 respectively through the third driving line, the third grounding line and the third input signal line. The first one of the column driving chips 123 and the fourth one of the column driving chips 123 may lead wires toward an edge of the light emitting element array through the fourth sub-portion respectively, then route wires along the edge of the light emitting element array through the third sub-portion and the second sub-portion in sequence respectively, and are finally connected to the external driving chip 121 through the first sub-portion respectively.

As shown in FIG. 8D, the column driving chip 123 includes, for example, a register, a reference constant current source, a channel driving module and a data processing module that are communicatively connected in sequence. The register is used to connect the second input terminal 1235 and the second output terminal 1236, for example, to store channel instructions. The reference constant current source is used to connect the second voltage signal terminal 1233 and the second grounding terminal 1234, for example, to control on/off of the input circuit voltage and the ground voltage. The channel driving module is used to connect the channel signal terminals, such as CH1 . . . CHn, to control on/off of each column of channel signals. The data processing module is used to process data that controls a column channel signal transmission.

As shown in FIG. 7, the first substrate includes, for example, an intersection region. A first straight line extending in the row direction and extending through the column driving chips 123 intersects with a second straight line extending in the column direction and extending through the row driving chips 122 in the intersection region.

For a plurality of column driving chips 123 located on a same side of the intersection region in the row direction, the second voltage signal terminal 1233, the second grounding terminal 1234 and the second output terminal 1236 of a column driving chip 123 in the plurality of column driving chips 123 are connected to the second voltage signal terminal 1233, the second grounding terminal 1234 and the second input terminal 1235 of another column driving chip 123 adjacent to the column driving chip 123 in the row direction respectively through a second voltage signal lead, a second grounding lead and a second signal lead; and the second voltage signal lead, the second grounding lead and the second signal lead respectively extend in the row direction.

In some exemplary embodiments of the present disclosure, the second voltage signal terminal 1233, the second grounding terminal 1234 and the second output terminal 1236 of the first one of the column driving chips 123 are electrically connected to the second voltage signal terminal 1233, the second grounding terminal 1234 and the second input terminal 1235 of the adjacent second one of the column driving chips 123 on the right side through the second voltage signal lead, the second grounding lead and the second signal lead. In a same manner, the second voltage signal lead, the second grounding lead and the second signal lead extend from the fourth one of the column driving chips 123 to the third one of the column driving chips 123 in the row direction, so as to achieve a connection of electrical signals of all columns in the light emitting element array.

As shown in FIG. 7, the plurality of row driving chips 122 include a second row driving chip 122 and a third row driving chip 122 that are closest to the intersection region. The second row driving chip 122 and the third row driving chip 122 are located on two opposite sides of the intersection region in the column direction. The first voltage signal lead, the first grounding lead and the first signal lead used to electrically connect the second row driving chip 122 and the third row driving chip 122 extend through the intersection region.

In some exemplary embodiments of the present disclosure, the second row driving chip 122 and the third row driving chip 122 may be, for example, the second one and the third one of the row driving chips 122 from top to bottom, respectively. The first voltage signal lead, the first grounding lead and the first signal lead used to electrically connect the second one and the third one of the row driving chips 122 extend through the intersection region.

Figure 9:
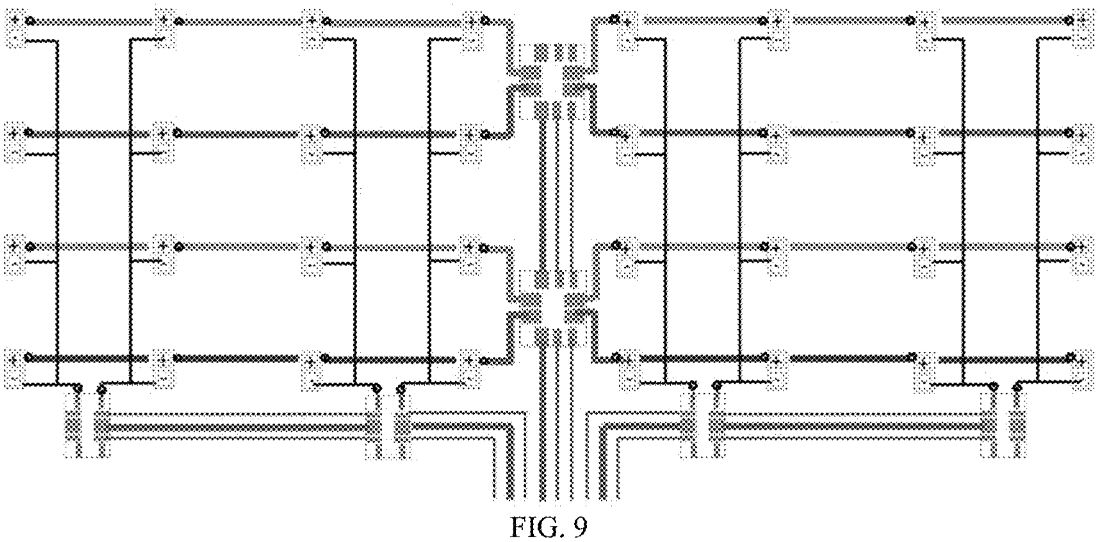
FIG. 9 is a schematic diagram of a drive architecture of a light emitting element array according to some other exemplary embodiments of the present disclosure.

FIG. 9 is a schematic diagram of a drive architecture of a light emitting element array according to some other exemplary embodiments of the present disclosure.

As shown in FIG. 9, the plurality of column driving chips 123 include, for example, a third column driving chip 123 and a fourth column driving chip 123 that are closest to the intersection region. The third column driving chip 123 and the fourth column driving chip 123 are located on two opposite sides of the intersection region in the row direction.

Specifically, the second voltage signal terminal 1233, the second grounding terminal 1234 and the second input terminal 1235 of the third column driving chip 123 are electrically connected to the external driving chip 121 respectively through a fourth driving line, a fourth grounding line and a fourth input signal line. The second voltage signal terminal 1233, the second grounding terminal 1234 and the second input terminal 1235 of the fourth column driving chip 123 are electrically connected to the external driving chip 121 respectively through a fifth driving line, a fifth grounding line and a fifth input signal line. As shown in FIG. 9, each of the fourth driving line, the fourth grounding line and the fourth input signal line extends through the intersection region; and each of the fifth driving line, the fifth grounding line and the fifth input signal line extends through the intersection region.

In some other exemplary embodiments of the present disclosure, the light emitting module may include, for example, two row driving chips 122 and four column driving chips 123. Each row driving chip 122 may drive two rows of light emitting elements, and each column driving chip 123 may drive two columns of light emitting elements. The control of the light emitting element array may be precise to four light emitting elements at intersections of two rows and two columns. The third column driving chip 123 may be, for example, the second one of the column driving chips 123 from left to right, and the fourth column driving chip 123 may be, for example, the third one of the column driving chips 123. The second voltage signal terminal 1233, the second grounding terminal 1234 and the second input terminal 1235 of the second one of the column driving chips 123 are electrically connected to the external driving chip 121 respectively through a fourth driving line, a fourth grounding line and a fourth input signal line. The second voltage signal terminal 1233, the second grounding terminal 1234 and the second input terminal 1235 of the third one of the column driving chips 123 are connected to the external driving chip 121 respectively through a fifth driving line, a fifth grounding line and a fifth input signal line. The solution of FIG. 9 provides another wiring layout for the column driving chips 123, which may avoid wiring along edges of the light emitting element array and reduce a size of a black edge (non-luminous region) at a screen bezel.

Figure 10:
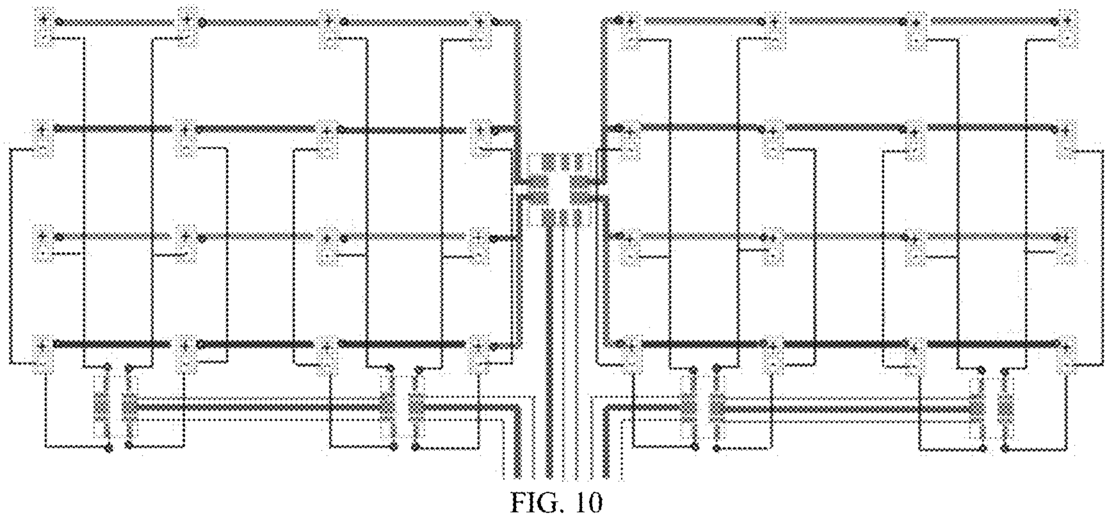
FIG. 10 is a schematic diagram of a drive architecture of a light emitting element array according to still other exemplary embodiments of the present disclosure.

FIG. 10 is a schematic diagram of a drive architecture of a light emitting element array according to still other exemplary embodiments of the present disclosure.

As shown in FIG. 10, at least one of the plurality of row driving chips 122 is used to drive at least four rows of light emitting elements.

The row driving chip 122 includes at least two first scanning signal terminals 1221 and at least two second scanning signal terminals 1222. One of the at least two first scanning signal terminals 1221 is electrically connected to the first electrodes 124 of a part of light emitting elements in at least two adjacent rows of light emitting elements, and another of the at least two first scanning signal terminals 1221 is electrically connected to the first electrodes 124 of another part of light emitting elements in the at least two adjacent rows of light emitting elements; and/or one of the at least two second scanning signal terminals 1222 is electrically connected to the first electrodes 124 of a part of light emitting elements in at least two adjacent rows of light emitting elements, and another of the at least two second scanning signal terminals 1222 is electrically connected to the first electrodes 124 of another part of light emitting elements in the at least two adjacent rows of light emitting elements.

In still other exemplary embodiments of the present disclosure, the light emitting module may include, for example, one row driving chip 122 and four column driving chips 123. The row driving chip 122 may include, for example, two first scanning signal terminals 1221 on an upper side, which may drive sixteen light emitting elements in a first row and a second row respectively through two first leads 1061. The row driving chip 122 may further include, for example, two second scanning signal terminals 1222 on a lower side, which may drive sixteen light emitting elements in a third row and a fourth row respectively through a first lead 1061. The row driving chip 122 may drive four rows of light emitting elements, and each column driving chip 123 may drive two columns of light emitting elements. The control of the light emitting element array is precious to, for example, eight light emitting elements at intersections of four rows and two columns. According to the solution of FIG. 9, the number of row driving chips 122 may be reduced in a case of reducing the resolution to a certain extent, then the structural design and manufacture are also simpler, and the costs may be reduced, which is suitable for screen usage scenarios that are less sensitive to resolution requirements.

Optionally, if a volume of the row driving chip 122 is increased to expand more MUX channels and strengthen a driving capability of the chip, more rows of LEDs may share a MUX, for example, three or four rows of LEDs may share a MUX. Similarly, a column driving chip 123 may also drive a plurality of columns of LEDs. By customizing MUX driving chips and CH constant current driving chips with different numbers of channels, it is possible to achieve greater flexibility in current backlight partitioning applications, which is suitable for various partitioning products.

In the related art, intersections of row and column wires may inevitably lead to complex wiring, and at least a double-layer board design is required whose wiring is shown in FIG. 6B, in which a thick and solid horizontal line represents a row driving connection line, i.e., the first lead 1061, and a thin and solid vertical line represents a column driving connection line, i.e., the second lead 1062. In such embodiment, the row driving connection line may transmit, for example, a high multiplexing (MUX) signal, and the column driving connection line may transmit, for example, a channel (CH) signal. In the drawing on the left side of FIG. 6B, each MUX signal drives a row of light emitting elements, that is, MUX1 corresponds to a first one of the row driving connection lines, MUX2 corresponds to a second one of the row driving connection lines, and MUXn corresponds to an $n^{th}$ one of the row driving connection lines. Each CH signal drives a column of light emitting elements, that is, CH1 corresponds to a first column of light emitting elements, CH2 corresponds to a second column of light emitting elements, and CHn corresponds to an $n^{th}$ column of light emitting elements. Each light emitting element may be controlled independently, which is beneficial for improving screen resolution. However, starting from the second row, each row driving connection line may intersect with previous n−1 column driving connection lines. In order to avoid short circuit and signal interference, it is needed to provide the row driving connection lines and the column driving connection lines in different layers of circuit boards, which is a double-layer board structure. In the drawing on the right side of FIG. 6B, each MUX signal may drive two rows of light emitting elements, that is, MUX1 corresponds to the first one and the second one of the row driving connection lines, MUX2 corresponds to the third one and the fourth one of the row driving connection lines, and MUXn corresponds to the $(n-1)^{th}$ one and the $n^{th}$ one of the row driving connection lines. Each CH signal drives half of a column of light emitting elements, that is, CH1-1 corresponds to odd numbered light emitting elements in the first column, CH2-1 corresponds to even numbered light emitting elements in the first column, CH1-2 corresponds to odd numbered light emitting elements in the second column, CH2-2 corresponds to even numbered light emitting elements in the second column, CH1-*n* corresponds to odd numbered light emitting element in the $n^{th}$ column, and CH2-*n* corresponds to even numbered light emitting element in the $n^{th}$ column. The number of wires is reduced, but the resolution is also reduced, and the row driving connection lines may also intersect with some column driving connection lines. In order to avoid short circuits and signal interference, it is needed to respectively provide the row driving connection lines, the column driving connection lines corresponding to the odd numbered rows, and column driving connection lines corresponding to the even numbered rows in circuit boards of different layers, which is a three-layer board structure. As the number of rows of light emitting elements driven by one and same MUX signal increases, the number of layers of circuit boards where the row driving connection line and the column driving connection line are located may also increase, and then the thickness of the product may be increased.

In addition, in the related art, as shown in FIG. 6C, the fan out region 127 with concentrated outgoing lines may occupy a large area when the lines are led at an edge of the back plate, resulting in a wide bezel. In addition, all the row and column signals may be concentrated in the fan out region 127, and there may be parallel outgoing lines with close distance, so that a significant interference may exist between the row and column signals.

Figure 11:
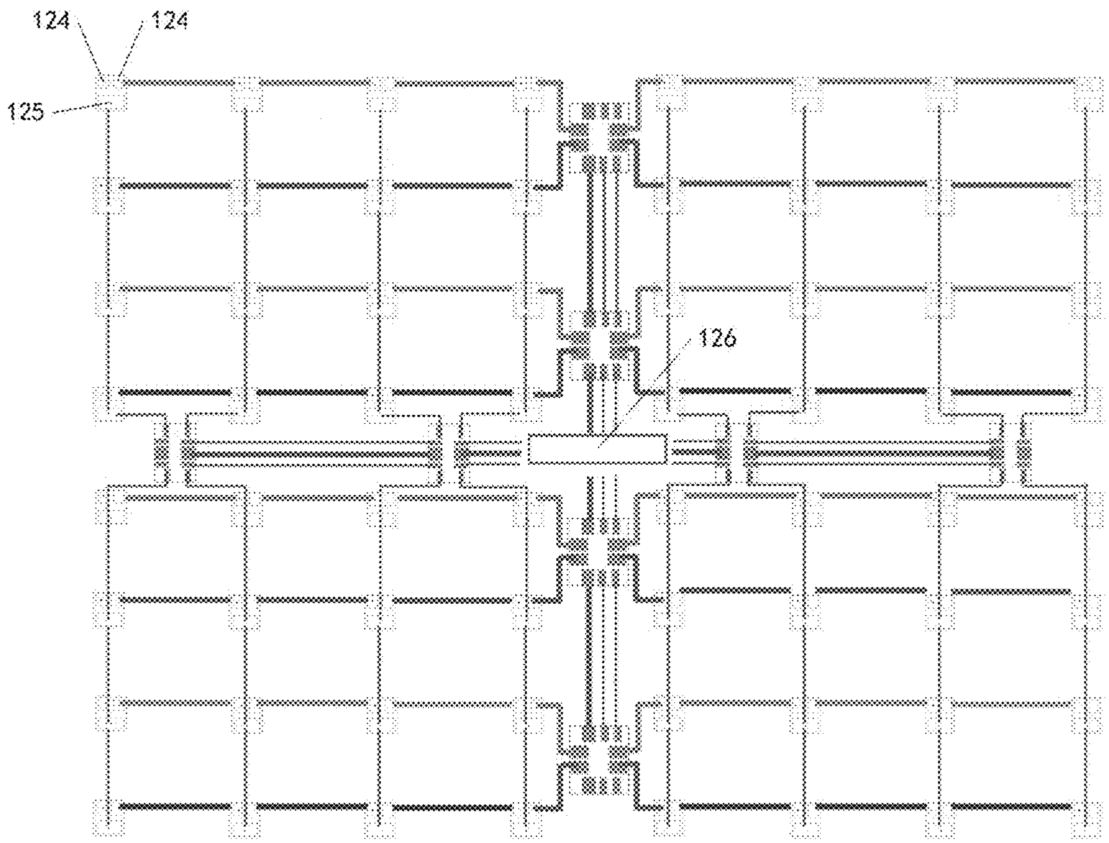
FIG. 11 is a schematic diagram of an outgoing line layout of a light emitting element array according to some exemplary embodiments of the present disclosure.

FIG. 11 is a schematic diagram of an outgoing line layout of a light emitting element array according to some exemplary embodiments of the present disclosure.

As shown in FIG. 11, the light emitting element includes, for example, two first electrodes 124 and a second electrode 125, and the two first electrodes 124 are spaced apart in the row direction. At least some of the plurality of second wires extend through a gap between the two first electrodes 124. An orthographic projection of the plurality of second wires on the base substrate does not overlap with an orthographic projection of the first electrodes 124 on the base substrate, and the orthographic projection of the plurality of second wires on the base substrate does not overlap with an orthographic projection of the plurality of first wires on the base substrate. The plurality of first wires and the plurality of second wires are located in a same conductive layer.

In yet other exemplary embodiments of the present disclosure, the light emitting element may include, for example, two positive electrodes and one negative electrode, instead of conventional one positive electrode and one negative electrode. A gap that allows for the second lead 1062 to pass through is provided between the two positive electrodes. Therefore, when the first lead 1061 connects the light emitting elements horizontally, it may not intersect with the second lead 1062 that runs longitudinally, and the second lead 1062 may not come into contact with the two positive electrodes that the second lead passes through. Therefore, the first lead 1061 and the second lead 1062 may be provided on a same layer of circuit board, and a thickness of the product may be reduced. Moreover, a connector 126 may be provided in the intersection region to export relevant driving lines, grounding lines and input signal lines respectively connected to the row driving chip 122 and the column driving chip 123, and to electrically connect them to the external driving chip 121. An introduction of the connector 126 may greatly reduce a complexity of the outgoing lines of row driving chip 122 and the column driving chip 123, so as to avoid a generation of the fan out region 127 with concentrated outgoing lines, and further reduce a size of the black edge (non-luminous region) at the screen bezel.

Figure 12:
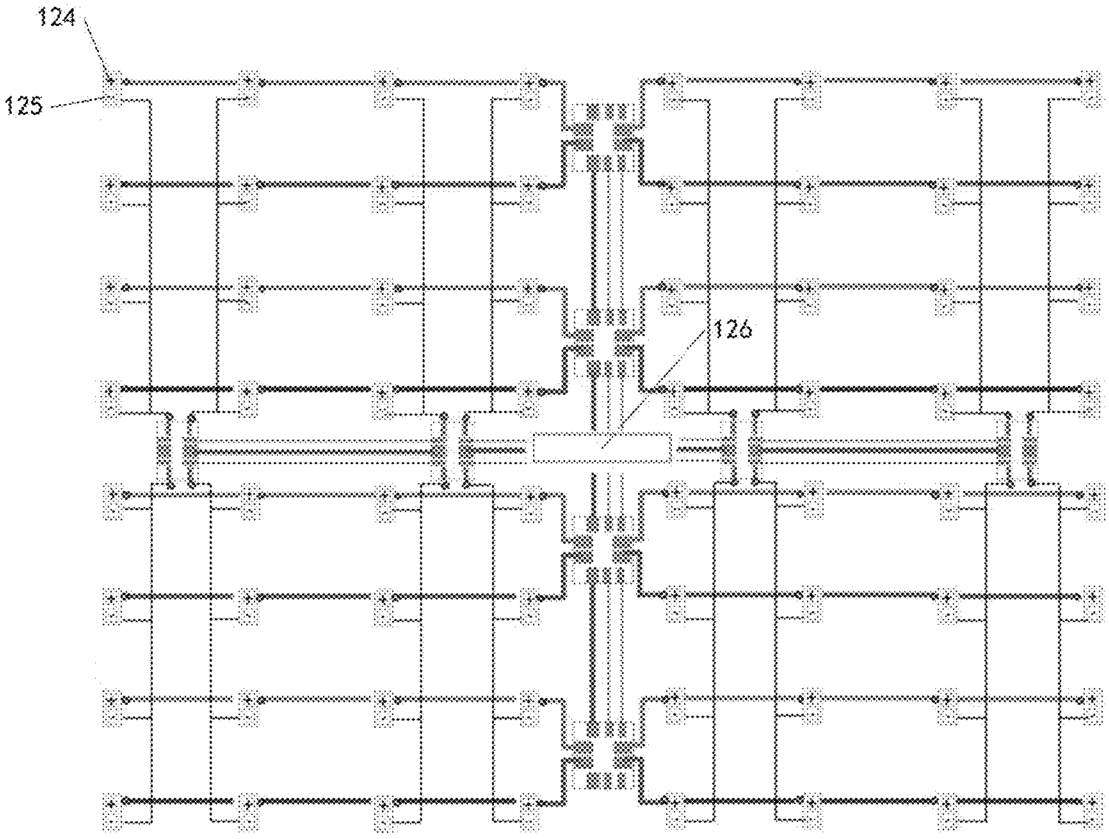
FIG. 12 is a schematic diagram of an outgoing line layout of a light emitting element array according to some other exemplary embodiments of the present disclosure.

FIG. 12 is a schematic diagram of an outgoing line layout of a light emitting element array according to some other exemplary embodiments of the present disclosure.

As shown in FIG. 12, a light emitting element with conventional one positive electrode and one negative electrode may also be used, that is, a connector 126 is provided in the intersection region to export the relevant driving lines, grounding lines and input signal lines respectively connected to the row driving chip 122 and the column driving chip 123, and electrically connect them to the external driving chip 121. In this way, it is also possible to avoid the generation of the fan out region 127 with concentrated outgoing lines, and further reduce the size of the black edge (non-luminous region) at the screen bezel.

Figure 13A:
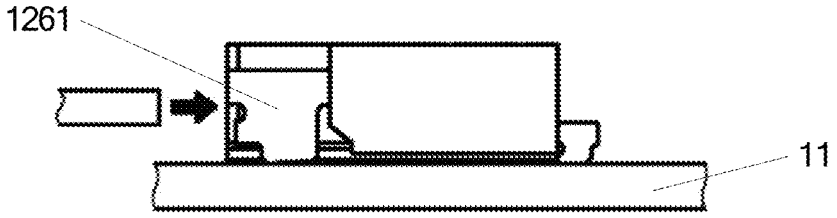
FIG. 13A is a schematic structural diagram of a connector according to some exemplary embodiments of the present disclosure.
Figure 13B:
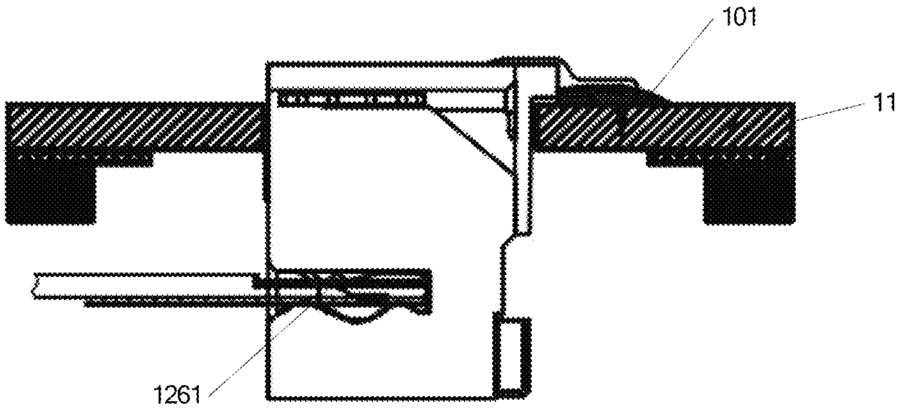
FIG. 13B is a schematic structural diagram of a connector according to some other exemplary embodiments of the present disclosure.

FIG. 13A is a schematic structural diagram of a connector according to some exemplary embodiments of the present disclosure. FIG. 13B is a schematic structural diagram of a connector according to some other exemplary embodiments of the present disclosure.

As shown in FIG. 13A, the light emitting module further includes a connector 126 provided on the base substrate, the connector 126 is located in the intersection region, and the connector 126 and the light emitting element array are located on a same side of the first substrate. The second row driving chip 122 and the third row driving chip 122 are respectively connected to the connector 126, and the third column driving chip 123 and the fourth column driving chip 123 are respectively connected to the connector 126. Alternatively, as shown in FIG. 13B, the light emitting module further includes a connector 126 provided on the base substrate, an orthographic projection of the connector 126 on the base substrate is located in the intersection region, and the connector 126 and the light emitting element array are located on opposite sides of the first substrate. The second row driving chip 122 and the third row driving chip 122 are respectively connected to the connector 126, and the third column driving chip 123 and the fourth column driving chip 123 are respectively connected to the connector 126.

In some exemplary embodiments of the present disclosure, the connector 126 is, for example, an ordinary connector. A solder pad of the connector 126 and an FFC (Flexible Flat Cable) are located on a same side of a backlight plate, and the base substrate is, for example, a PCB (Printed Circuit Board). The ordinary connector, the row driving chip 122 and the column driving chip 123 are located on a same side of the PCB. The second one of the row driving chips 122 and the third one of the row driving chips 122 are respectively connected to the connector 126, and the second one of the column driving chips 123 and the third one of the column driving chips 123 are respectively connected to the connector 126. The connection method is, for example, the relevant driving lines, grounding lines and input signal lines are welded to the solder pads of the ordinary connector, and being connected to the external driving chip 121, for example, by inserting into a socket 1261 on the connector 126 through the FPC (Flexible Printed Circuit).

In some other exemplary embodiments of the present disclosure, the connector 126 is, for example, a perforated connector. The solder pad of the connector 126 and the FFC are located on different sides of the backlight plate, and the base substrate is, for example, an aluminum substrate. The socket 1261 of the perforated connector used to connect the external driving chip 121 is located on an opposite side of the aluminum substrate to the row driving chip 122 and the column driving chip 123. The second one of the row driving chips 122 and the third one of the row driving chips 122 are respectively connected to the connector 126, and the second one of the column driving chips 123 and the third one of the column driving chips 123 are respectively connected to the connector 126. The connection method is, for example, the relevant driving lines, grounding lines and input signal lines are welded to the solder pads of the perforated connector on a side of the light emitting element, and being connected to the external driving chip 121, for example, by inserting an FFC flexible cable through a guide edge into the socket 1261 on the opposite side of the aluminum substrate.

Preferably, by combining the aforementioned 3pin LED and the perforated connector, it is possible to design a backlight plate using a single-layer aluminum substrate, with better heat dissipation and lower costs, so that the overall display product may have improved performance and have unparalleled competitive advantages.

It may be understood that a material of the base substrate may be other materials than PCB and aluminum substrate, such as glass. In a case of a non-metallic backlight product such as glass substrate, technical solutions of the present disclosure may be implemented using side technology (row driving chip 122 and column driving chip 123 are located on sides).

In summary, in the PM Mini LED backlight driving solution, the MUX driving IC and the CH constant current driving IC are respectively placed on the LED surface of the back plate, so that the power consumption may be evenly distributed to the row driving IC and the column driving IC, which is beneficial for an overall heat dissipation and temperature reduction of the back plate. In addition, the wiring complexity is significantly reduced, with fewer outgoing lines in the fan out region, less interference, and greatly improved performance. Coupled with the ordinary connector, an ultra-narrow bezel design of the overall product may be achieved, and the costs may be significantly reduced.

Figure 14:
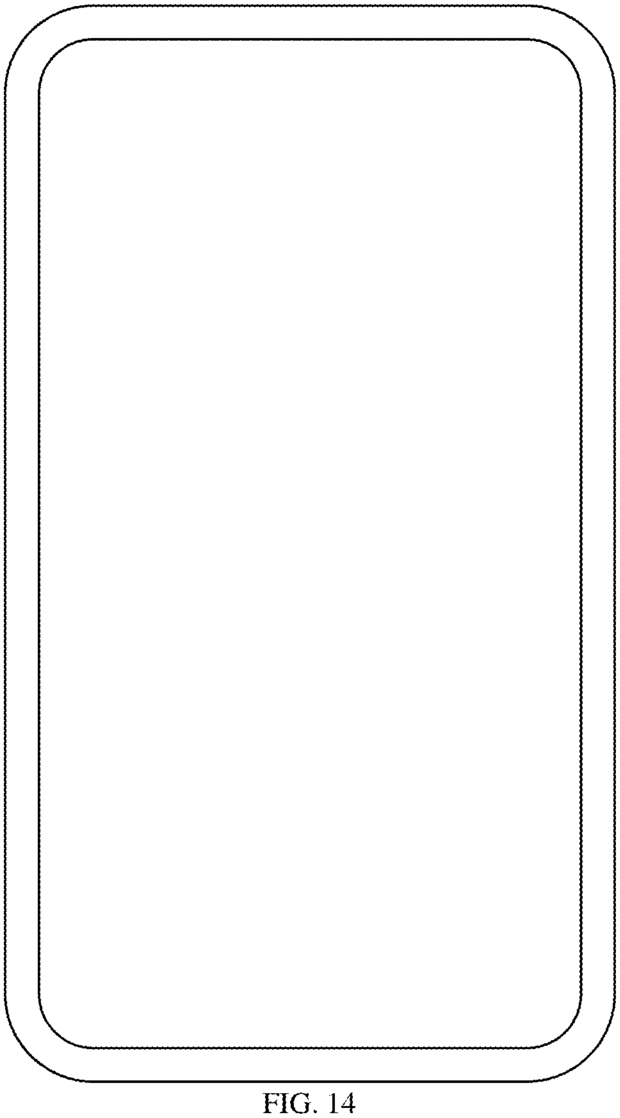
FIG. 14 is a schematic diagram of a display device according to some exemplary embodiments of the present disclosure.

Some exemplary embodiments of the present disclosure further provide a display device. FIG. 14 is a schematic diagram of a display device according to some exemplary embodiments of the present disclosure. Referring to FIG. 14, the display device includes the aforementioned light emitting module.

The display device may be any product or component with display function. For example, the display device may be a smart phone, a portable phone, a navigation apparatus, a television (TV), a car audio body, a laptop computer, a tablet computer, portable multimedia player (PMP), a personal digital assistant (PDA), etc.

It should be understood that the display device according to some exemplary embodiments of the present disclosure may have all characteristics and advantages of the aforementioned light emitting module. Those characteristics and advantages may be referred to the above description for the light emitting substrate, which will not be repeated here.

As used here, the terms "substantially", "about", "approximately" and other similar terms are used as terms of approximation rather than as terms of degree, and they are intended to explain an inherent deviation of a measured or calculated value that will be recognized by those ordinary skilled in the art. Taking into account process fluctuations, measurement problems, and errors related to a measurement of specific quantities (that is, limitations of a measurement system), the terms "about" or "approximately" used here includes a stated value and means that a specific value determined by those ordinary skilled in the art is within an acceptable range of deviation. For example, "about" may mean within one or more standard deviations, or within ±10% or ±5% of the stated value.

Although some embodiments according to the general inventive concept of the present disclosure have been illustrated and described, it should be understood by those ordinary skilled in the art that these embodiments may be changed without departing from the principle and spirit of the general inventive concept of the present disclosure. The scope of the present disclosure is defined by the claims and their equivalents.

What is claimed is:

1. A light emitting module, comprising:

a first substrate;

a light emitting element array provided on the first substrate, wherein the light emitting element array comprises a plurality of light emitting elements arranged in an array in a row direction and a column direction, each of the plurality of light emitting elements comprises a first electrode and a second electrode, and a driving current of the light emitting element is greater than or equal to 1 mA;

a plurality of row driving chips provided on the first substrate, wherein at least one of the plurality of row driving chips is configured to drive at least one row of light emitting elements; and a plurality of column driving chips provided on the first substrate, wherein at least one of the plurality of column driving chips is configured to drive at least one column of light emitting elements, wherein at least one of the plurality of row driving chips and at least one of the plurality of column driving chips are spaced apart in a row direction and a column direction;

wherein at least one of the plurality of row driving chips is electrically connected to the first electrodes of the at least one row of light emitting elements, and at least one of the plurality of column driving chips is electrically connected to the second electrodes of the at least one column of light emitting elements;

wherein the light emitting module further comprises a plurality of first wires provided on the first substrate, and at least one of the plurality of first wires extends in the row direction, the at least one of the plurality of row driving chips comprises a first scanning signal terminal, and the first scanning signal terminal is electrically connected to the first electrodes of at least part of the light emitting elements in the at least one row of light emitting elements through the plurality of first wires; and wherein the light emitting module further comprises a plurality of second wires provided on the first substrate, and at least one of the plurality of second wires extends in the column direction, the at least one of the plurality of column driving chips comprises a first channel signal terminal, and the first channel signal terminal is electrically connected to the second electrodes of at least part of the light emitting elements in the at least one column of light emitting elements through the plurality of second wires.

2. The light emitting module according to claim 1, wherein the plurality of row driving chips are arranged in a column and spaced apart in the column direction; and/or wherein the plurality of column driving chips are arranged in a row and spaced apart in the row direction.

3. The light emitting module according to claim 1, wherein the at least one of the plurality of row driving chips further comprises a second scanning signal terminal, and the second scanning signal terminal is electrically connected to the first electrodes of at least part of the light emitting elements in the at least one row of light emitting elements through the plurality of first wires.

4. The light emitting module according to claim 3, wherein for a single row driving chip of the plurality of row driving chips, the first scanning signal terminal is electrically connected to the first electrodes of at least part of the light emitting elements in an $i^{th}$ row of light emitting elements, and the second scanning signal terminal is electrically connected to the first electrodes of at least part of the light emitting elements in an $(i+1)^{th}$ row of light emitting elements, where i is a positive integer greater than or equal to 1.

5. The light emitting module according to claim 4, wherein the at least one of the plurality of column driving chips further comprises a second channel signal terminal, and the second channel signal terminal is electrically connected to the second electrodes of at least part of the light emitting elements in the at least one column of light emitting elements through the plurality of second wires.

6. The light emitting module according to claim 5, wherein for a single column driving chip of the plurality of column driving chips, the first channel signal terminal is electrically connected to the second electrodes of at least part of the light emitting elements in a $j^{th}$ column of light emitting elements, and the second channel signal terminal is electrically connected to the second electrodes of at least part of the light emitting elements in a $(j+1)^{th}$ column of light emitting elements, where j is a positive integer greater than or equal to 1.

7. The light emitting module according to claim 6, wherein the single row driving chip comprises at least two first scanning signal terminals and at least two second scanning signal terminals; and wherein a first one of the at least two first scanning signal terminals is electrically connected to the first electrodes of a first part of the light emitting elements in the $i^{th}$ row of light emitting elements, and a second one of the at least two first scanning signal terminals is electrically connected to the first electrodes of a second part of the light emitting elements in the $i^{th}$ row of light emitting elements; and/or wherein a first one of the at least two second scanning signal terminals is electrically connected to the first electrodes of a first part of the light emitting elements in the $(i+1)^{th}$ row of light emitting elements, and a second one of the at least two second scanning signal terminals is electrically connected to the first electrodes of a second part of the light emitting elements in the $(i+1)^{th}$ row of light emitting elements.

8. The light emitting module according to claim 7, wherein the single column driving chip comprises at least two first channel signal terminals and at least two second channel signal terminals; and wherein a first one of the at least two first channel signal terminals is electrically connected to the second electrodes of a first part of the light emitting elements in the $j^{th}$ column of light emitting elements, and a second one of the at least two first channel signal terminals is electrically connected to the second electrodes of a second part of the light emitting elements in the $j^{th}$ column of light emitting elements; and/or wherein a first one of the at least two second channel signal terminals is electrically connected to the second electrodes of a first part of the light emitting elements in the $(j+1)^{th}$ column of light emitting elements, and a second one of the at least two second channel signal terminals is electrically connected to the second electrodes of a second part of the light emitting elements in the $(j+1)^{th}$ column of light emitting elements.

9. The light emitting module according to claim 8, wherein the single row driving chip further comprises a first voltage signal terminal, a first grounding terminal, a first input terminal, and a first output terminal; and wherein the light emitting module further comprises an external driving chip provided on the first substrate, the plurality of row driving chips comprise a first row driving chip closest to the external driving chip, and the first voltage signal terminal, the first grounding terminal and the first input terminal of the first row driving chip are respectively electrically connected to the external driving chip through a first driving line, a first grounding line and a first input signal line.

10. The light emitting module according to claim 9, wherein the first voltage signal terminal, the first grounding terminal and the first output terminal of the single row driving chip in the plurality of row driving chips are respectively electrically connected to the first voltage signal terminal, the grounding terminal and the first input terminal of another row driving chip adjacent in the column direction, through a first voltage signal lead, a first grounding lead and a first signal lead; and wherein the first voltage signal lead, the first grounding lead and the first signal lead respectively extend in the column direction.

11. The light emitting module according to claim 3, wherein the first substrate comprises an intersection region, and a first straight line extending in the row direction and extending through each column driving chip intersects, in the intersection region, with a second straight line extending in the column direction and extending through each row driving chip; and wherein the plurality of row driving chips comprise a second row driving chip and a third row driving chip that are closest to the intersection region, the plurality of column driving chips comprise a third column driving chip and a fourth column driving chip that are closest to the intersection region, the second row driving chip and the third row driving chip are located on two opposite sides of the intersection region in the column direction, and the third column driving chip and the fourth column driving chip are located on two opposite sides of the intersection region in the row direction.

12. The light emitting module according to claim 11, wherein the single column driving chip further comprises a second voltage signal terminal, a second grounding terminal, a second input terminal, and a second output terminal;

wherein the light emitting module further comprises an external driving chip provided on the first substrate, the plurality of column driving chips comprise a first column driving chip and a second column driving chip that are closest to a side edge of the first substrate in the column direction, the second voltage signal terminal, the second grounding terminal and the second input terminal of the first column driving chip are respectively electrically connected to the external driving chip through a second driving line, a second grounding line and a second input signal line, and the second voltage signal terminal, the second grounding terminal and the second input terminal of the second column driving chip are respectively electrically connected to the external driving chip through a third driving line, a third grounding line and a third input signal line;

wherein for a plurality of column driving chips located on a same side of the intersection region in the row direction, the second voltage signal terminal, the second grounding terminal and the second output terminal of a column driving chip in the plurality of column driving chips are respectively connected to the second voltage signal terminal, the second grounding terminal and the second input terminal of another column driving chip adjacent in the row direction through a second voltage signal lead, a second grounding lead and a second signal lead;

wherein the second voltage signal lead, the second grounding lead and the second signal lead respectively extend in the row direction;

wherein each of the second driving line, the second grounding line and the second input signal line comprises a first sub-portion, a second sub-portion, a third sub-portion and a fourth sub-portion that are connected in sequence, the first sub-portion is connected to the external driving chip, the fourth sub-portion is connected to the column driving chip, the second sub-portion extends in the row direction, the third sub-portion extends in the column direction, and the second sub-portion of each of the second driving line, the second grounding line and the second input signal line and the third sub-portion of each of the second driving line, the second grounding line and the second input signal line are located in a peripheral region of the first substrate; and wherein the first voltage signal lead, the first grounding lead and the first signal lead that are configured to electrically connect the second row driving chip and the third row driving chip extend through the intersection region.

13. The light emitting module according to claim 11, wherein the light emitting module further comprises an external driving chip provided on the first substrate;

wherein the second voltage signal terminal, the second grounding terminal and the second input terminal of the third column driving chip are respectively electrically connected to the external driving chip through a fourth driving line, a fourth grounding line and a fourth input signal line, and the second voltage signal terminal, the second grounding terminal and the second input terminal of the fourth column driving chip are connected to the external driving chip respectively through a fifth driving line, a fifth grounding line and a fifth input signal line;

wherein each of the fourth driving line, the fourth grounding line and the fourth input signal line extends through the intersection region; and wherein each of the fifth driving line, the fifth grounding line and the fifth input signal line extends through the intersection region.

14. The light emitting module according to claim 3, wherein the at least one of the plurality of row driving chips is configured to drive at least four rows of light emitting elements, and the at least one of the plurality of row driving chips comprises at least two first scanning signal terminals and at least two second scanning signal terminals; and wherein a first one of the at least two first scanning signal terminals is electrically connected to the first electrodes of a first part of the light emitting elements in at least two adjacent rows of light emitting elements, and a second one of the at least two first scanning signal terminals is electrically connected to the first electrodes of a second part of light emitting elements in the at least two adjacent rows of light emitting elements; and/or wherein a first one of the at least two second scanning signal terminals is electrically connected to the first electrodes of a first part of the light emitting elements in at least two adjacent rows of light emitting elements, and a second one of the at least two second scanning signal terminals is electrically connected to the first electrodes of a second part of the light emitting elements in the at least two adjacent rows of light emitting elements.

15. The light emitting module according to claim 11, wherein the light emitting element comprises two first electrodes and a second electrode, and the two first electrodes are spaced apart in the row direction;

wherein at least one of the plurality of second wires extends through a gap between the two first electrodes, an orthographic projection of the plurality of second wires on the base substrate does not overlap with an orthographic projection of the first electrodes on the base substrate, and the orthographic projection of the plurality of second wires on the base substrate does not overlap with an orthographic projection of the plurality of first wires on the base substrate; and wherein the plurality of first wires and the plurality of second wires are located in a same conductive layer.

16. The light emitting module according to claim 15, wherein the light emitting module further comprises a connector provided on the base substrate, the connector is located in the intersection region, and the connector and the light emitting element array are located on a same side of the first substrate; and wherein the second row driving chip and the third row driving chip are respectively connected to the connector, and the third column driving chip and the fourth column driving chip are respectively connected to the connector.

17. The light emitting module according to claim 15, wherein the light emitting module further comprises a connector provided on the base substrate, an orthographic projection of the connector on the base substrate is located in the intersection region, and the connector and the light emitting element array are located on opposite sides of the first substrate; and wherein the second row driving chip and the third row driving chip are respectively connected to the connector, and the third column driving chip and the fourth column driving chip are respectively connected to the connector.

18. A display device, comprising the light emitting module according to claim 1.

* * * * *